United States Patent
Kontomaris

(10) Patent No.: US 10,458,286 B2
(45) Date of Patent: *Oct. 29, 2019

(54) COMPOSITIONS COMPRISING TETRAFLUOROPROPENE AND TETRAFLUOROETHANE; THEIR USE IN POWER CYCLES; AND POWER CYCLE APPARATUS

(71) Applicant: The Chemours Company FC, LLC, Wilmington, DE (US)

(72) Inventor: Konstantinos Kontomaris, Wilmington, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/158,649

(22) Filed: Oct. 12, 2018

(65) Prior Publication Data

US 2019/0040767 A1 Feb. 7, 2019

Related U.S. Application Data

(63) Continuation of application No. 15/034,811, filed as application No. PCT/US2014/066828 on Nov. 21, 2014, now Pat. No. 10,132,200.

(60) Provisional application No. 61/907,407, filed on Nov. 22, 2013.

(51) Int. Cl.
*F01K 25/08* (2006.01)
*C09K 5/04* (2006.01)

(52) U.S. Cl.
CPC .............. *F01K 25/08* (2013.01); *C09K 5/045* (2013.01); *C09K 5/048* (2013.01); *C09K 2205/126* (2013.01); *C09K 2205/22* (2013.01); *C09K 2205/32* (2013.01)

(58) Field of Classification Search
CPC ......... F01K 25/08; C09K 5/045; C09K 5/048; C09K 2205/126; C09K 2205/22; C09K 2205/32
USPC ...................................................... 60/517, 516
See application file for complete search history.

(56) References Cited

U.S. PATENT DOCUMENTS

| | | | |
|---|---|---|---|
| 7,524,805 B2 | 4/2009 | Singh | |
| 7,825,081 B2 | 11/2010 | Singh | |
| 7,914,696 B2 | 3/2011 | Low | |
| 9,175,202 B2 | 11/2015 | Low | |
| 9,783,720 B2 | 10/2017 | Kontomaris | |
| 9,828,536 B2 | 11/2017 | Kontomaris | |
| 9,828,537 B2 | 11/2017 | Fukushima | |
| 10,132,200 B2 * | 11/2018 | Kontomaris | C09K 5/045 |
| 10,144,856 B2 * | 12/2018 | Fukushima | C09K 5/045 |
| 2006/0106263 A1 | 5/2006 | Miller et al. | |
| 2006/0243944 A1 | 11/2006 | Minor et al. | |
| 2008/0308763 A1 | 12/2008 | Singh et al. | |
| 2011/0162410 A1 | 7/2011 | Low | |
| 2011/0191268 A1 | 8/2011 | Low | |
| 2013/0160478 A1 | 6/2013 | Kontomaris | |
| 2013/0193368 A1 | 8/2013 | Low | |
| 2013/0219929 A1 | 8/2013 | Kontomaris | |
| 2013/0247597 A1 | 9/2013 | Kontomaris | |
| 2014/0191154 A1 * | 7/2014 | Minor | C09K 3/30 252/68 |
| 2015/0184048 A1 | 7/2015 | Minor | |
| 2015/0202581 A1 | 7/2015 | Low | |
| 2015/0315447 A1 | 11/2015 | Low | |
| 2018/0179428 A1 * | 6/2018 | Minor | C09K 5/045 |
| 2018/0327646 A1 * | 11/2018 | Kontomaris | C09K 5/045 |
| 2019/0031934 A1 * | 1/2019 | Fukushima | C09K 5/044 |

FOREIGN PATENT DOCUMENTS

| | | |
|---|---|---|
| CN | 102124071 | 7/2011 |
| CN | 102408876 | 4/2012 |
| CN | 102782076 | 11/2012 |
| CN | 102918132 | 2/2013 |
| CN | 102965082 | 3/2013 |
| CN | 102971394 | 3/2013 |
| CN | 103254875 | 8/2013 |
| JP | 2011-168771 | 10/2011 |
| WO | WO-2011101617 | 8/2011 |
| WO | WO-2012082939 | 6/2012 |
| WO | WO-2012082941 | 6/2012 |
| WO | WO 2013/15022 | 10/2013 |

OTHER PUBLICATIONS

Chen et al, "A supercritical Rankine cycle using zeotropic mixture working fluids for the conversion of low-grade heat into power," Energy 36, 2011, pp. 549-555, Elsevier Ltd.
Doherty et al, "Conceptual Design of Distillation systems," 2001, pp. 185-186 and 351-359, McGraw-Hill, New York, NY.
Hong et al, "Performance analysis of transcritical organic rankine cycle," Journal of Chongqing University, 2012, 35: 56-67 (with English abstract).
Office Action in Chinese Application No. 201480063729.1, dated Oct. 8, 2018, 16 pages (with English translation).
Office Action in Japanese Application No. 2016-533590, dated Oct. 9, 2018, 9 pages (with English translation).

(Continued)

*Primary Examiner* — Douglas J McGinty

(57) ABSTRACT

A method for converting heat from a heat source to mechanical energy is provided. The method comprises heating a working fluid E-1,3,3,3-tetrafluoropropene and at least one compound selected from 1,1,1,2-tetrafluoroethane and 1,1,2,2-tetrafluoroethane using heat supplied from the heat source; and expanding the heated working fluid to lower the pressure of the working fluid and generate mechanical energy as the pressure of the working fluid is lowered. Additionally, a power cycle apparatus containing a working fluid to convert heat to mechanical energy is provided. The apparatus contains a working fluid comprising E-1,3,3,3-tetrafluoropropene and at least one compound selected from 1,1,1,2-tetrafluoroethane and 1,1,2,2-tetrafluoroethane. A working fluid is provided comprising an azeotropic or azeotrope-like combination of E-1,3,3,3-tetrafluoropropene, 1,1,2,2-tetrafluoroethane and 1,1,2,2-tetrafluoroethane.

20 Claims, 3 Drawing Sheets

(56) References Cited

OTHER PUBLICATIONS

Office Action in Taiwan Application No. 103140389, dated Jan. 21, 2018, 12 pages (English translation).
PCT International Search Report and Written Opinion dated Feb. 26, 2015.
Tahir et al, "Efficiency of Compact Organic Rankine Cycle System with Rotary-Vane-Type Expander for Low-Temperature Waste Heat Recovery," International Journal of Civil and Environmental Engineering, 2:1, 2010, pp. 11-16.
Japanese Office Action in Japanese Application No. 2016-533590, dated May 28, 2019, 15 pages. (with English translation).

* cited by examiner

COMPOSITIONS COMPRISING TETRAFLUOROPROPENE AND TETRAFLUOROETHANE; THEIR USE IN POWER CYCLES; AND POWER CYCLE APPARATUS

CROSS-REFERENCE TO RELATED APPLICATIONS

This is a continuation of U.S. patent application Ser. No. 15/034,811, filed May 5, 2016, which is a 35 U.S.C. § 371 National Stage Application of International Application No. PCT/US2014/066828, filed Nov. 21, 2014, which claims priority to U.S. Provisional Application No. 61/907,407, filed Nov. 22, 2013. The entire content of each of these applications is hereby incorporated herein by reference.

FIELD OF THE INVENTION

This invention relates to methods and systems having utility in numerous applications, and in particular, in power cycles, such as organic Rankine cycles.

BACKGROUND OF THE INVENTION

Low global warming potential working fluids are needed for power cycles such as organic Rankine cycles. Such materials must have low environmental impact, as measured by low global warming potential and low or zero ozone depletion potential.

SUMMARY OF THE INVENTION

The present invention involves a composition comprising E-1,3,3,3-tetrafluoropropene(E-HFO-1234ze) and at least one tetrafluoroethane, 1,1,2,2-tetrafluoroethane (HFC-134) or 1,1,1,2-tetrafluoroethane (HFC-134a) as described in detail herein.

In accordance with this invention, a method is provided for converting heat from a heat source to mechanical energy. The method comprises heating a working fluid comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) using heat supplied from a heat source; and expanding the heated working fluid to lower the pressure of the working fluid and generate mechanical energy as the pressure of the working fluid is lowered.

In accordance with this invention, a power cycle apparatus containing a working fluid to convert heat to mechanical energy is provided. The apparatus contains a working fluid comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a).

In accordance with this invention, a working fluid is provided comprising E-1,3,3,3-tetrafluoropropene (E-HFO-1234ze), 1,1,2,2-tetrafluoroethane (HFC-134) and 1,1,1,2-tetrafluoroethane (HFC-134a).

BRIEF DESCRIPTION OF THE DRAWINGS

FIG. 3 is a plot of the vapor pressure of a composition containing E-HFO-1234ze and HFC-134 as compared to the vapor pressure of HFC-134a.

DETAILED DESCRIPTION OF PREFERRED EMBODIMENTS

Figure 1:
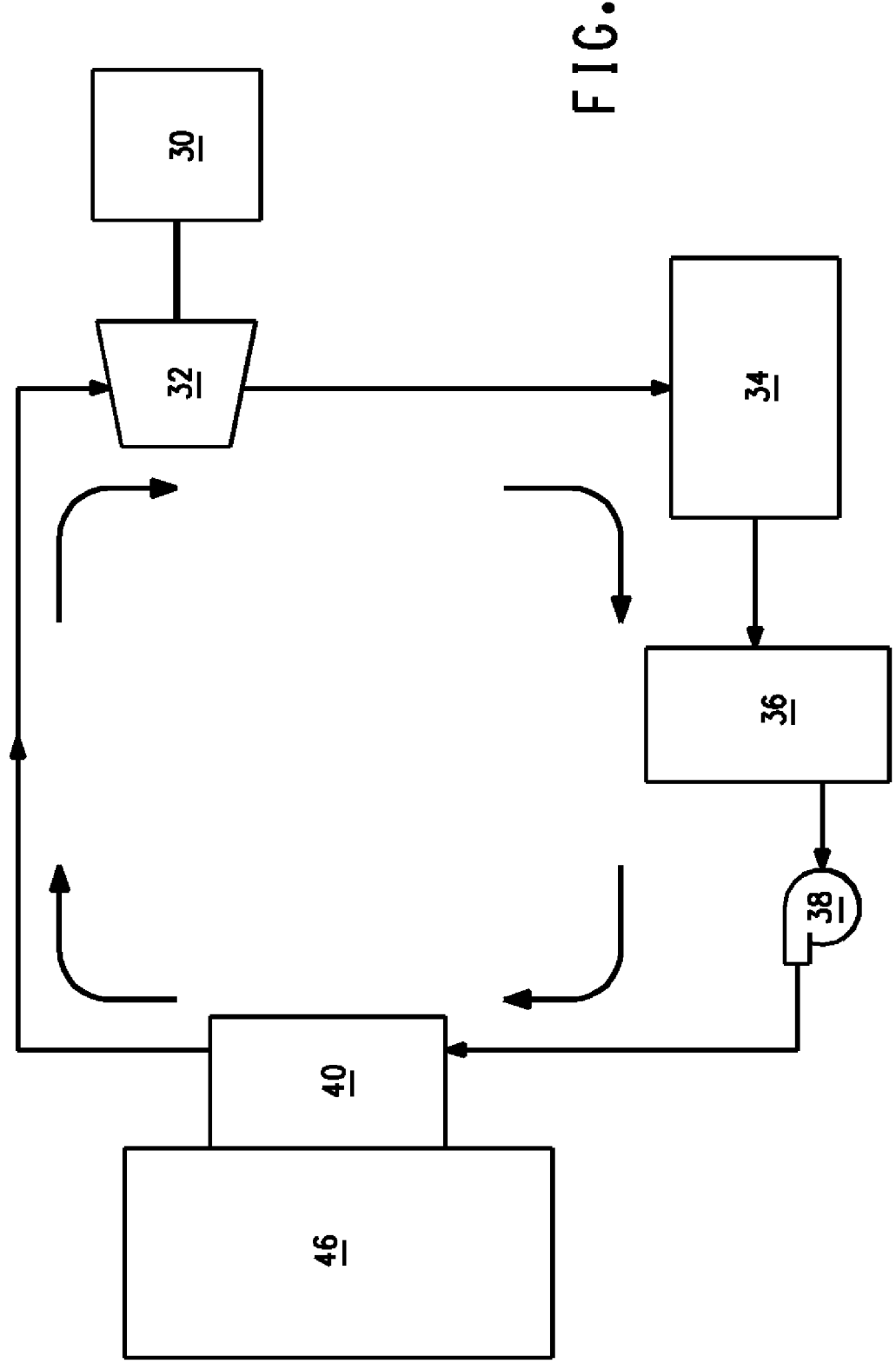
FIG. 1 is a block diagram of a heat source and an organic Rankine cycle system in direct heat exchange according to the present invention.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Net cycle power output is the rate of mechanical work generation at the expander (e.g., a turbine) less the rate of mechanical work consumed by the compressor (e.g., a liquid pump).

Volumetric capacity for power generation is the net cycle power output per unit volume of working fluid (as measured at the conditions at the expander outlet) circulated through the power cycle (e.g., organic Rankine cycle).

Cycle efficiency (also referred to as thermal efficiency) is the net cycle power output divided by the rate at which heat is received by the working fluid during the heating stage of a power cycle (e.g., organic Rankine cycle).

Subcooling is the reduction of the temperature of a liquid below that liquid's saturation point for a given pressure. The saturation point is the temperature at which a vapor composition is completely condensed to a liquid (also referred to as the bubble point). But subcooling continues to cool the liquid to a lower temperature liquid at the given pressure. Subcool amount is the amount of cooling below the saturation temperature (in degrees) or how far below its saturation temperature a liquid composition is cooled.

Superheat is a term that defines how far above its saturation vapor temperature of a vapor composition is heated. Saturation vapor temperature is the temperature at which, if the composition is cooled, the first drop of liquid is formed, also referred to as the "dew point".

Temperature glide (sometimes referred to simply as "glide") is the absolute value of the difference between the starting and ending temperatures of a phase-change process by a refrigerant within a component of a refrigerant system, exclusive of any subcooling or superheating. This term may be used to describe condensation or evaporation of a near azeotrope or non-azeotropic composition. Average glide refers to the average of the glide in the evaporator and the glide in the condenser of a specific chiller system operating under a given set of conditions.

An azeotropic composition is a mixture of two or more different components which, when in liquid form under a given pressure, will boil at a substantially constant temperature, which temperature may be higher or lower than the boiling temperatures of the individual components, and which will provide a vapor composition essentially identical to the overall liquid composition undergoing boiling. (see, e.g., M. F. Doherty and M. F. Malone, Conceptual Design of Distillation Systems, McGraw-Hill (New York), 2001, 185-186, 351-359).

Accordingly, the essential features of an azeotropic composition are that at a given pressure, the boiling point of the liquid composition is fixed and that the composition of the vapor above the boiling composition is essentially that of the overall boiling liquid composition (i.e., no fractionation of the components of the liquid composition takes place). It is also recognized in the art that both the boiling point and the weight percentages of each component of the azeotropic composition may change when the azeotropic composition is subjected to boiling at different pressures. Thus, an azeotropic composition may be defined in terms of the unique relationship that exists among the components or in terms of the compositional ranges of the components or in terms of exact weight percentages of each component of the composition characterized by a fixed boiling point at a specified pressure.

For the purpose of this invention, an azeotrope-like composition means a composition that behaves substantially like an azeotropic composition (i.e., has constant boiling characteristics or a tendency not to fractionate upon boiling or evaporation). Hence, during boiling or evaporation, the vapor and liquid compositions, if they change at all, change only to a minimal or negligible extent. This is to be contrasted with non-azeotrope-like compositions in which during boiling or evaporation, the vapor and liquid compositions change to a substantial degree.

As used herein, the terms "comprises," "comprising," "includes," "including," "has," "having" or any other variation thereof, are intended to cover a non-exclusive inclusion. For example, a composition, process, method, article, or apparatus that comprises a list of elements is not necessarily limited to only those elements but may include other elements not expressly listed or inherent to such composition, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The transitional phrase "consisting of" excludes any element, step, or ingredient not specified. If in the claim such would close the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" is used to define a composition, method or apparatus that includes materials, steps, features, components, or elements, in addition to those literally disclosed provided that these additional included materials, steps, features, components, or elements do materially affect the basic and novel characteristic(s) of the claimed invention. The term 'consisting essentially of' occupies a middle ground between "comprising" and 'consisting of'.

Where applicants have defined an invention or a portion thereof with an open-ended term such as "comprising," it should be readily understood that (unless otherwise stated) the description should be interpreted to also describe such an invention using the terms "consisting essentially of" or "consisting of."

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

E-1,3,3,3-tetrafluoropropene (E-HFO-1234ze, E-CHF=CHCF$_3$) is available commercially from fluorocarbon manufacturers or may be made by methods known in the art. In particular, this compound may be prepared by dehydrofluorination of a group of pentafluoropropanes, including 1,1,1,2,3-pentafluoropropane (HFC-245eb, CF$_3$CHFCH$_2$F), 1,1,1,3,3-pentafluoropropane (HFC-245fa, CF$_3$CH$_2$CHF$_2$). The dehydrofluorination reaction may take place in the vapor phase in the presence or absence of catalyst, and also in the liquid phase by reaction with caustic, such as NaOH or KOH. These reactions are described in more detail in U.S. Patent Publication No. 2006/0106263, incorporated herein by reference.

1,1,1,2-tetrafluoroethane (HFC-134a, CF$_3$CH$_2$F) is available available commercially from many refrigerant producers and distributors or may be prepared by methods known in the art. HFC-134a may be made by the hydrogenation of 1,1-dichloro-1,1,1,2-tetrafluoroethane (i.e., CCl$_2$FCF$_3$ or CFC-114a) to 1,1,1,2-tetrafluoroethane. Additionally, 1,1,2,2-tetrafluoroethane (HFC-134, CHF$_2$CHF$_2$) may be made by the hydrogenation of 1,2-dichloro-1,1,2,2-tetrafluoroethane (i.e., CClF$_2$CClF$_2$ or CFC-114) to 1,1,2,2-tetrafluoroethane.

Power Cycle Methods

Heat at temperatures up to about 100° C. is abundantly available from various sources. It can be captured as a byproduct from various industrial processes, it can be collected from solar irradiation through solar panels or it can be extracted from geological hot water reservoirs through shallow or deep wells. Such heat can be converted to mechanical or electrical power for various uses through Rankine cycles using working fluids comprising E-HFO-1234ze and HFC-134 or working fluids comprising E-HFO-1234ze, HFC-134, and HFC-134a.

A sub-critical organic Rankine cycle (ORC) is defined as a Rankine cycle in which the organic working fluid used in the cycle receives heat at a pressure lower than the critical pressure of the organic working fluid and the working fluid remains below its critical pressure throughout the entire cycle.

A trans-critical ORC is defined as a Rankine cycle in which the organic working fluid used in the cycle receives heat at a pressure higher than the critical pressure of the organic working fluid. In a trans-critical cycle, the working fluid is not at a pressure higher than its critical pressure throughout the entire cycle.

A super-critical power cycle is defined as a power cycle which operates at pressures higher than the critical pressure of the organic working fluid used in the cycle and involves the following steps: compression; heating; expansion; cooling.

In accordance with this invention, a method is provided for converting heat from a heat source to mechanical energy. The method comprises heating a working fluid using heat supplied from the heat source; and expanding the heated working fluid to lower the pressure of the working fluid and generate mechanical energy as the pressure of the working fluid is lowered. The method is characterized by using a working fluid comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a). In another embodiment, the method is characterized by using a working fluid comprising E-HFO-1234ze and HFC-134 or a working fluid comprising E-HFO-1234ze, HFC-134, and HFC-134a.

The method of this invention is typically used in an organic Rankine power cycle. Heat available at relatively low temperatures compared to steam (inorganic) power cycles can be used to generate mechanical power through Rankine cycles using working fluids comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a). In the method of this invention, working fluid comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) is compressed prior to being heated. Compression may be provided by a pump which pumps working fluid to a heat transfer unit (e.g., a heat exchanger or an evaporator) where heat from the heat source is used to heat the working fluid. The heated working fluid is then expanded, lowering its pressure. Mechanical energy is generated during the working fluid expansion using an expander. Examples of expanders include turbo or dynamic expanders, such as turbines, and positive displacement expanders, such as screw expanders, scroll expanders, and piston expanders. Examples of expanders also include rotary vane expanders (Musthafah b. Mohd. Tahir, Noboru Yamada, and Tetsuya Hoshino, International Journal of Civil and Environmental Engineering 2:1 2010).

Mechanical power can be used directly (e.g. to drive a compressor) or be converted to electrical power through the use of electrical power generators. In a power cycle where the working fluid is re-used, the expanded working fluid is cooled. Cooling may be accomplished in a working fluid cooling unit (e.g. a heat exchanger or a condenser). The cooled working fluid can then be used for repeated cycles (i.e., compression, heating, expansion, etc.). The same pump used for compression may be used for transferring the working fluid from the cooling stage.

In one embodiment, the method for converting heat to mechanical energy uses a working fluid comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a).

Of note in the method for converting heat to mechanical energy are working fluids that consist essentially E-1,3,3,3-tetrafluoropropene (E-HFO-1234ze) and 1,1,2,2-tetrafluoroethane (HFC-134). Also of note in the method for converting heat to mechanical energy are working fluids consisting essentially of E-1,3,3,3-tetrafluoropropene (E-HFO-1234ze), 1,1,2,2-tetrafluoroethane (HFC-134), and 1,1,1,2-tetrafluoroethane (HFC-134a). Also of note are methods for converting heat from a heat source to mechanical energy wherein the working fluid comprises or consists essentially of E-1,3,3,3-tetrafluoropropene (E-HFO-1234ze) and 1,1,2,2-tetrafluoroethane (HFC-134). In another embodiment of the method for converting heat to mechanical energy, the working fluid consists of E-1,3,3,3-tetrafluoropropene (E-HFO-1234ze) and 1,1,2,2-tetrafluoroethane (HFC-134). Also of note are methods for converting heat from a heat source to mechanical energy wherein the working fluid comprises or consists essentially of E-1,3,3,3-tetrafluoropropene (E-HFO-1234ze) and 1,1,1,2-tetrafluoroethane (HFC-134a). In another embodiment of the method for converting heat to mechanical energy, the working fluid consists of E-1,3,3,3-tetrafluoropropene (E-HFO-1234ze) and 1,1,1,2-tetrafluoroethane (HFC-134a).

Of note for use in power cycle apparatus are compositions comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) that are non-flammable. Certain compositions comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) are non-flammable by standard test ASTM 681. It is expected that certain compositions comprising E-HFO-1234ze and HFC-134 and/or HFC-134a are non-flammable by standard test ASTM 681. Of particular note are compositions containing E-HFO-1234ze and HFC-134 and/or HFC-134a with no more than 85 weight percent E-HFO-1234ze. Also of particular note are compositions containing E-HFO-1234ze and HFC-134 and/or HFC-134a with no more than 84 weight percent E-HFO-1234ze. Also of particular note are compositions containing E-HFO-1234ze and HFC-134 and/or HFC-134a with no more than 83 weight percent E-HFO-1234ze. Also of particular note are compositions containing E-HFO-1234ze and HFC-134 and/or HFC-134a with no more than 82 weight percent E-HFO-1234ze. Also of particular note are compositions containing E-HFO-1234ze and HFC-134 and/or HFC-134a with no more than 81 weight percent E-HFO-1234ze. Also of particular note are compositions containing E-HFO-1234ze and HFC-134 and/or HFC-134a with no more than 80 weight percent E-HFO-1234ze. Also of particular note are compositions containing E-HFO-1234ze and HFC-134 and/or HFC-134a with no more than 78 weight percent E-HFO-1234ze. Also of particular note are compositions containing E-HFO-1234ze and HFC-134 and/or HFC-134a with no more than 76 weight percent E-HFO-1234ze. Also of particular note are compositions containing E-HFO-1234ze and HFC-134 and/or HFC-134a with no more than 74 weight percent E-HFO-1234ze. Also of particular note are compositions containing E-HFO-1234ze and HFC-134 and/or HFC-134a no more than 72 weight percent E-HFO-1234ze. Also of particular note are compositions containing E-HFO-1234ze and HFC-134 and/or HFC-134a no more than 70 weight percent E-HFO-1234ze. Also of particular note are compositions containing E-HFO-1234ze and HFC-134 with no more than 69 weight percent E-HFO-1234ze. Therefore, of particular note are compositions containing from about 1 weight percent to 69 weight percent E-HFO-1234ze and about 99 weight percent to 31 weight percent HFC-134. Also of particular note are compositions containing E-HFO-1234ze and HFC-134a with no more than 85 weight percent E-HFO-1234ze. Therefore, of particular note are compositions containing from about 1 weight percent to 85 weight percent E-HFO-1234ze and about 99 weight percent to 15 weight percent HFC-134a. Additionally, of particular note are compositions containing from about 55 weight percent to about 81 weight percent E-HFO-1234ze and about 45 weight percent to about 18 weight percent HFC-134a. Further, of particular note are compositions containing from about 55 weight percent to about 70 weight percent E-HFO-1234ze and about 45 weight percent to about 30 weight percent HFC-134a. Also of particular note are azeotropic and azeotrope-like compositions comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a). In particular, azeotrope-like compositions containing from about 1 to about 99 weight percent E-1,3,3,3-tetrafluoropropene and from about 99 to about 1 weight percent HFC-134 or azeotrope-like compositions containing from about 1 to about 99 weight percent E-1,3,3,3-tetrafluoropropene and from about 99 to about 1 weight percent HFC-134a.

Of particular utility in the method converting heat to mechanical energy are those embodiments wherein the working fluid consists essentially of E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a). Also of particular utility are those embodiments wherein the working fluid consists of E-1,3,3,3-tetrafluoropropene (E-HFO-1234ze) 1,1,2,2-tetrafluoroethane (HFC-134). Also of particular utility are those embodiments wherein the working fluid consists of E-1,3,3,3-tetrafluoropropene (E-HFO-1234ze), 1,1,2,2-tetrafluoroethane (HFC-134) and 1,1,1,2-tetrafluoroethane (HFC-134a).

Of particular note, for use in the method converting heat to mechanical energy, are compositions containing from about 35 to about 95 weight percent E-1,3,3,3-tetrafluoropropene and from about 5 to about 65 weight percent HFC-134. Also of particular note, for use in the method converting heat to mechanical energy, are azeotropic and azeotrope-like compositions containing from about 5 to about 95 weight percent E-1,3,3,3-tetrafluoropropene and from about 5 to about 95 weight percent HFC-134. Also of particular note, for use in the method converting heat to mechanical energy, are azeotropic and azeotrope-like compositions containing from about 5 to about 60 weight percent E-1,3,3,3-tetrafluoropropene and from about 40 to about 95 weight percent HFC-134. Also of particular note, for use in the method converting heat to mechanical energy, are azeotropic and azeotrope-like compositions containing from about 35 to about 60 weight percent E-1,3,3,3-tetrafluoropropene and from about 40 to about 65 weight percent HFC-134. Also of particular note, for use in the method converting heat to mechanical energy, are azeotropic and azeotrope-like compositions containing from about 63 to about 75 weight percent E-1,3,3,3-tetrafluoropropene and from about 37 to about 25 weight percent HFC-134.

Also of particular note, for use in the method converting heat to mechanical energy, are compositions containing from about 35 to about 95 weight percent E-1,3,3,3-tetrafluoropropene and from about 5 to about 65 weight percent total of HFC-134 and HFC-134a. Also of particular note, for use in the method converting heat to mechanical energy, are azeotropic and azeotrope-like compositions containing from about 5 to about 95 weight percent E-1,3,3,3-tetrafluoropropene and from about 5 to about 95 weight percent total of HFC-134 and HFC-134a. Also of particular note, for use in the method converting heat to mechanical energy, are azeotropic and azeotrope-like compositions containing from about 5 to about 60 weight percent E-1,3,3,3-tetrafluoropropene and from about 40 to about 95 weight percent total of HFC-134 and HFC-134a.

Also of particular note, for use in the method converting heat to mechanical energy, are azeotropic and azeotrope-like compositions containing from about 35 to about 95 weight percent E-1,3,3,3-tetrafluoropropene and from about 5 to about 65 weight percent total of HFC-134 and HFC-134a. Also of particular note, for use in the method converting heat to mechanical energy, are azeotropic and azeotrope-like compositions containing from about 35 to about 60 weight percent E-1,3,3,3-tetrafluoropropene and from about 40 to about 65 weight percent total of HFC-134 and HFC-134a.

For compositions useful in the method for converting heat to mechanical energy, are compositions containing E-1,3,3,3-tetrafluoropropene, HFC-134, and HFC-134a. In particular, of note are compositions comprising from about 5 to about 95 weight percent E-1,3,3,3-tetrafluoropropene, from about 5 to about 95 weight percent of HFC-134 and from about 5 to about 95 weight percent of HFC-134a. Also of note are compositions comprising from about 35 to about 95 weight percent E-1,3,3,3-tetrafluoropropene, from about 2 to about 38 weight percent of HFC-134 and from about 2 to about 39 weight percent of HFC-134a. Also of note are compositions comprising from about 35 to about 60 weight percent E-1,3,3,3-tetrafluoropropene, from about 10 to about 26 weight percent of HFC-134 and from about 24 to about 49 weight percent of HFC-134a. Also of note are compositions comprising from about 5 to about 60 weight percent E-1,3,3,3-tetrafluoropropene, from about 10 to about 38 weight percent of HFC-134 and from about 24 to about 72 weight percent of HFC-134a.

Also of particular utility for use in the method converting heat to mechanical energy are those embodiments wherein the working fluid has a low GWP. For GWP less than 1000, compositions containing E-HFO-1234ze and HFC-134 comprise from 11 weight percent to 99 weight percent E-HFO-1234ze and 89 weight percent to 1 weight percent HFC-134. For GWP less than 1000, compositions containing E-HFO-1234ze and HFC-134a comprise from 30.5 weight percent to 99 weight percent E-HFO-1234ze and 69.5 weight percent to 1 weight percent HFC-134a.

For GWP less than 500, compositions containing E-HFO-1234ze and HFC-134 comprise from 56 weight percent to 99 weight percent E-HFO-1234ze and 44 weight percent to 1 weight percent HFC-134. For GWP less than 500, compositions containing E-HFO-1234ze and HFC-134a comprise from 65.5 weight percent to 99 weight percent E-HFO-1234ze and 34.5 weight percent to 1 weight percent HFC-134a.

For GWP less than 150, compositions containing E-HFO-1234ze and HFC-134 comprise from 87.5 weight percent to 99 weight percent E-HFO-1234ze and 12.5 weight percent to 1 weight percent HFC-134. For GWP less than 150, compositions containing E-HFO-1234ze and HFC-134a comprise from 90 weight percent to 99 weight percent E-HFO-1234ze and 10 weight percent to 1 weight percent HFC-134a.

In one embodiment, the present invention relates to a method for converting heat from a heat source to mechanical energy using a sub-critical cycle. This method comprises the following steps:
(a) compressing a liquid working fluid to a pressure below its critical pressure;
(b) heating compressed liquid working fluid from (a) using heat supplied by the heat source to form vapor working fluid;
(c) expanding heated working fluid from (b) to lower the pressure of the working fluid and generate mechanical energy;
(d) cooling expanded working fluid from (c) to form a cooled liquid working fluid; and
(e) cycling cooled liquid working fluid from (d) to (a) for compression.

In the first step of the sub-critical Organic Rankine Cycle (ORC) system, described above, the working fluid in liquid phase comprising E-1,3,3,3-tetrafluoropropene (E-HFO-1234ze) and at least one compound selected from 1,1,2,2- tetrafluoroethane (HFC-134) and 1,1,1,2-tetrafluoroethane (HFC-134a) is compressed to above its critical pressure. In a second step, said working fluid is passed through a heat exchanger to be heated to a higher temperature before the fluid enters the expander wherein said heat exchanger is in thermal communication with said heat source. The heat exchanger receives heat energy from the heat source by any known means of thermal transfer. The ORC system working fluid circulates through the heat supply heat exchanger where it gains heat.

Embodiments including use of one or more internal heat exchangers (e.g., a recuperator), and/or use of more than one cycle in a cascade system are intended to fall within the scope of the sub-critical ORC power cycles of the present invention.

In one embodiment, the present invention relates to a method for converting heat from a heat source to mechanical energy using a trans-critical cycle. This method comprises the following steps:
   (a) compressing a liquid working fluid above said working fluid's critical pressure;
   (b) heating compressed working fluid from (a) using heat supplied by the heat source;
   (c) expanding heated working fluid from (b) to lower the pressure of the working fluid below its critical pressure and generate mechanical energy;
   (d) cooling expanded working fluid from (c) to form a cooled liquid working fluid; and
   (e) cycling cooled liquid working fluid from (d) to (a) for compression.

In the first step of the trans-critical Organic Rankine Cycle (ORC) system, described above, the working fluid in liquid phase comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) is compressed to above its critical pressure. In a second step, said working fluid is passed through a heat exchanger to be heated to a higher temperature before the fluid enters the expander wherein said heat exchanger is in thermal communication with said heat source. The heat exchanger receives heat energy from the heat source by any known means of thermal transfer. The ORC system working fluid circulates through the heat supply heat exchanger where it gains heat.

In the next step, at least a portion of the heated working fluid is removed from said heat exchanger and is routed to the expander where the expansion process results in conversion of at least portion of the heat energy content of the working fluid into mechanical shaft energy. The shaft energy can be used to do any mechanical work by employing conventional arrangements of belts, pulleys, gears, transmissions or similar devices depending on the desired speed and torque required. In one embodiment, the shaft can also be connected to an electric power-generating device such as an induction generator. The electricity produced can be used locally or delivered to the grid. The pressure of the working fluid is reduced to below critical pressure of said working fluid, thereby producing vapor phase working fluid.

In the next step, the working fluid is passed from the expander to a condenser, wherein the vapor phase working fluid is condensed to produce liquid phase working fluid. The above steps form a loop system and can be repeated many times.

Embodiments including use of one or more internal heat exchangers (e.g., a recuperator), and/or use of more than one cycle in a cascade system are intended to fall within the scope of the trans-critical ORC power cycles of the present invention.

Additionally, for a trans-critical organic Rankine cycle, there are several different modes of operation.

In one mode of operation, in the first step of a trans-critical organic Rankine cycle, the working fluid is compressed above the critical pressure of the working fluid substantially isentropically. In the next step, the working fluid is heated under a constant pressure (isobaric) condition to above its critical temperature. In the next step, the working fluid is expanded substantially isentropically at a temperature that maintains the working fluid in the vapor phase. At the end of the expansion the working fluid is a superheated vapor at a temperature below its critical temperature. In the last step of this cycle, the working fluid is cooled and condensed while heat is rejected to a cooling medium. During this step the working fluid condensed to a liquid. The working fluid could be subcooled at the end of this cooling step.

In another mode of operation of a trans-critical ORC power cycle, in the first step, the working fluid is compressed above the critical pressure of the working fluid, substantially isentropically. In the next step the working fluid is then heated under a constant pressure condition to above its critical temperature, but only to such an extent that in the next step, when the working fluid is expanded substantially isentropically, and its temperature is reduced, the working fluid is close enough to the conditions for a saturated vapor that partial condensation or misting of the working fluid may occur. At the end of this step, however, the working fluid is still a slightly superheated vapor. In the last step, the working fluid is cooled and condensed while heat is rejected to a cooling medium. During this step the working fluid condensed to a liquid. The working fluid could be subcooled at the end of this cooling/condensing step.

In another mode of operation of a trans-critical ORC power cycle, in the first step, the working fluid is compressed above the critical pressure of the working fluid, substantially isentropically. In the next step, the working fluid is heated under a constant pressure condition to a temperature either below or only slightly above its critical temperature. At this stage, the working fluid temperature is such that when the working fluid is expanded substantially isentropically in the next step, the working fluid is partially condensed. In the last step, the working fluid is cooled and fully condensed and heat is rejected to a cooling medium. The working fluid could be subcooled at the end of this step.

While the above embodiments for a trans-critical ORC cycle show substantially isentropic expansions and compressions, and isobaric heating or cooling, other cycles wherein such isentropic or isobaric conditions are not maintained but the cycle is nevertheless accomplished, are within the scope of the present invention.

In one embodiment, the present invention relates to a method for converting heat from a heat source to mechanical energy using a super-critical cycle. This method comprises the following steps:
   (a) compressing a working fluid from a pressure above its critical pressure to a higher pressure;
   (b) heating compressed working fluid from (a) using heat supplied by the heat source;
   (c) expanding heated working fluid from (b) to lower the pressure of the working fluid to a pressure above its critical pressure and generate mechanical energy;
   (d) cooling expanded working fluid from (c) to form a cooled working fluid above its critical pressure; and (e) cycling cooled liquid working fluid from (d) to (a) for compression.

Embodiments including use of one or more internal heat exchangers (e.g., a recuperator), and/or use of more than one cycle in a cascade system are intended to fall within the scope of the super-critical ORC power cycles of the present invention.

Typically, in the case of sub-critical Rankine cycle operation, most of the heat supplied to the working fluid is supplied during the evaporation of the working fluid. As a result the working fluid temperature is essentially constant during the transfer of heat from the heat source to the working fluid. In contrast, the working fluid temperature can vary when the fluid is heated isobarically without phase change at a pressure above its critical pressure. Accordingly, when the heat source temperature varies, the use of a fluid above its critical pressure to extract heat from a heat source allows better matching between the heat source temperature and the working fluid temperature compared to the case of sub-critical heat extraction. As a result, the efficiency of the heat exchange process in a super-critical cycle or a trans-critical cycle is often higher than that of the sub-critical cycle (see Chen et al, Energy, 36, (2011) 549-555 and references therein).

The critical temperature and pressure of E-1,3,3,3-tetrafluoropropene are 109.4° C. and 3.63 MPa, respectively. The critical temperature and pressure of HFC-134a are 101.1° C. and 4.06 MPa, respectively. The critical temperature and pressure of HFC-134 are 118.6° C. and 4.62 MPa, respectively. Use of E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) as a working fluid can enable Rankine cycles that receive heat from heat sources with temperatures higher than the critical temperature thereof in a super-critical cycle or a trans-critical cycle. Higher temperature heat sources can lead to higher cycle energy efficiencies and volumetric capacities for power generation (relative to lower temperature heat sources). When heat is received using a working fluid above its critical temperature, a fluid heater having a specified pressure and exit temperature (essentially equal to the expander inlet temperature) is used instead of the evaporator (or boiler) used in the conventional sub-critical Rankine cycle.

In one embodiment of the above methods, the efficiency of converting heat to mechanical energy (cycle efficiency) is at least about 2%. In a suitable embodiment, the efficiency can be selected from the following:

about 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, and about 25%.

In another embodiment, the efficiency is selected from a range that has endpoints (inclusive) as any two efficiency numbers supra.

Typically for sub-critical cycles, the temperature to which the working fluid is heated using heat from the heat source is in the range of from about 50° C. to less than the critical temperature of the working fluid, preferably from about 80° C. to less than the critical temperature of the working fluid, more preferably from about 95° C. to less than the critical temperature of the working fluid. Typically for trans-critical and super-critical cycles, the temperature to which the working fluid is heated using heat from the heat source is in the range of from above the critical temperature of the working fluid to about 400° C., preferably from above the critical temperature of the working fluid to about 300° C., more preferably from above the critical temperature of the working fluid to 250° C.

In a suitable embodiment, the temperature of operation at the expander inlet can be any one of the following temperatures or within the range (inclusive) defined by any two numbers below:

about 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, and about 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 323, 323, 324, 325, 326, 327, 328, 329, 330, 331, 323, 333, 334, 335, 336, 337, 338, 339, 340, 341, 342, 343, 344, 345, 346, 347, 348, 349, 350, 351, 352, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 385, 386, 387, 388, 389, 390, 391, 392, 393, 394, 395, 396, 397, 398, 399, 400° C.

The pressure of the working fluid in the expander is reduced from the expander inlet pressure to the expander outlet pressure. Typical expander inlet pressures for super-critical cycles are within the range of from about 5 MPa to about 15 MPa, preferably from about 5 MPa to about 10 MPa, and more preferably from about 5 MPa to about 8 MPa. Typical expander outlet pressures for super-critical cycles are within 1 MPa above the critical pressure.

Typical expander inlet pressures for trans-critical cycles are within the range of from about the critical pressure to about 15 MPa, preferably from about the critical pressure to about 10 MPa, and more preferably from about the critical pressure to about 8 MPa. Typical expander outlet pressures for trans-critical cycles are within the range of from about 0.15 MPa to about 1.8 MPa, more typically from about 0.25 MPa to about 1.10 MPa, more typically from about 0.35 MPa to about 0.75 MPa.

Typical expander inlet pressures for sub-critical cycles are within the range of from about 0.99 MPa to about 0.1 MPa below the critical pressure, preferably from about 1.6 MPa to about 0.1 MPa below the critical pressure, and more preferably from about 2.47 MPa to about 0.1 MPa below the critical pressure. Typical expander outlet pressures for sub-critical cycles are within the range of from about 0.15 MPa to about 1.8 MPa, more typically from about 0.25 MPa to about 1.10 MPa, more typically from about 0.35 MPa to about 0.75 MPa.

The cost of a power cycle apparatus can increase when design for higher pressure is required. Accordingly, there is generally at least an initial cost advantage to limiting the maximum cycle operating pressure. Of note are cycles where the maximum operating pressure (typically present in the working fluid heater or evaporator and the expander inlet) does not exceed 2.2 MPa The working fluids of the present invention may be used in an ORC system to generate mechanical energy from heat extracted or received from relatively low temperature heat sources such as low pressure steam, industrial waste heat, solar energy, geothermal hot water, low-pressure geothermal steam, or distributed power generation equipment utilizing fuel cells or turbines, including microturbines, or internal combustion engines.

One source of low-pressure steam could be the process known as a binary geothermal Rankine cycle. Large quantities of low-pressure steam can be found in numerous locations, such as in fossil fuel powered electrical generating power plants.

Of note are sources of heat including waste heat recovered from gases exhausted from mobile internal combustion engines (e.g. truck or ship or rail Diesel engines), waste heat from exhaust gases from stationary internal combustion engines (e.g. stationary Diesel engine power generators), waste heat from fuel cells, heat available at Combined Heating, Cooling and Power or District Heating and Cooling plants, waste heat from biomass fueled engines, heat from natural gas or methane gas burners or methane-fired boilers or methane fuel cells (e.g. at distributed power generation facilities) operated with methane from various sources including biogas, landfill gas and coal-bed methane, heat from combustion of bark and lignin at paper/pulp mills, heat from incinerators, heat from low pressure steam at conventional steam power plants (to drive "bottoming" Rankine cycles), and geothermal heat.

Also of note are sources of heat including solar heat from solar panel arrays including parabolic solar panel arrays, solar heat from Concentrated Solar Power plants, heat removed from photovoltaic (PV) solar systems to cool the PV system to maintain a high PV system efficiency.

Also of note are sources of heat including at least one operation associated with at least one industry selected from the group consisting of: oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns, calcining operations, steel industry, glass industry, foundries, smelting, air-conditioning, refrigeration, and central heating.

In one embodiment of the Rankine cycles of this invention, geothermal heat is supplied to the working fluid circulating above ground (e.g. binary cycle geothermal power plants). In another embodiment of the Rankine cycles of this invention, the working fluid is used both as the Rankine cycle working fluid and as a geothermal heat carrier circulating underground in deep wells with the flow largely or exclusively driven by temperature-induced fluid density variations, known as "the thermosyphon effect".

In other embodiments, the present invention also uses other types of ORC systems, for example, small scale (e.g. 1-500 kw, preferably 5-250 kw) Rankine cycle systems using micro-turbines or small size positive displacement expanders, combined, multistage, and cascade Rankine Cycles, and Rankine Cycle systems with recuperators to recover heat from the vapor exiting the expander.

Other sources of heat include at least one operation associated with at least one industry selected from the group consisting of: oil refineries, petrochemical plants, oil and gas pipelines, chemical industry, commercial buildings, hotels, shopping malls, supermarkets, bakeries, food processing industries, restaurants, paint curing ovens, furniture making, plastics molders, cement kilns, lumber kilns, calcining operations, steel industry, glass industry, foundries, smelting, air-conditioning, refrigeration, and central heating.

Power Cycle Apparatus

In accordance with this invention, a power cycle apparatus for converting heat to mechanical energy is provided. The apparatus contains a working fluid comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a). Typically, the apparatus of this invention includes a heat exchange unit where the working fluid can be heated and an expander where mechanical energy can be generated by expanding the heated working fluid by lowering its pressure. Expanders include turbo or dynamic expanders, such as turbines, and positive displacement expanders, such as screw expanders, scroll expanders, piston expanders and rotary vane expanders. Mechanical power can be used directly (e.g. to drive a compressor) or be converted to electrical power through the use of electrical power generators. Typically the apparatus also includes a working fluid cooling unit (e.g., condenser or heat exchanger) for cooling the expanded working fluid and a compressor for compressing the cooled working fluid.

In one embodiment, the power cycle apparatus of the present invention comprises (a) a heat exchange unit; (b) an expander in fluid communication with the heat exchange unit; (c) a working fluid cooling unit in fluid communication with the expander; and (d) a compressor in fluid communication with the working fluid cooler; wherein the compressor is further being in fluid communication with the heat exchange unit such that the working fluid then repeats flow through components (a), (b), (c) and (d) in a repeating cycle; wherein the working fluid comprises E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a).

In one embodiment, the power cycle apparatus uses a working fluid comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a). Of note are working fluids that consist essentially of E-1,3,3,3-tetrafluoropropene (E-HFO-1234ze) and 1,1,2,2-tetrafluoroethane (HFC-134). Also of note are working fluids that consist essentially of E-1,3,3,3-tetrafluoropropene (E-HFO-1234ze), 1,1,2,2-tetrafluoroethane (HFC-134), and 1,1,1,2-tetrafluoroethane (HFC-134a).

Of note for use in power cycle apparatus are compositions comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) that are non-flammable. Certain compositions comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) are non-flammable by standard test ASTM 681. It is expected that certain compositions comprising E-HFO-1234ze and HFC-134 and/or HFC-134a are non-flammable by standard test ASTM 681. Of particular note are compositions containing E-HFO-1234ze and HFC-134 and/or HFC-134a with no more than weight percent 85 weight percent E-HFO- 1234ze. Also of particular note are compositions containing E-HFO-1234ze and HFC-134 and/or HFC-134a with no more than 84 weight percent E-HFO-1234ze. Also of particular note are compositions containing E-HFO-1234ze and HFC-134 and/or HFC-134a with no more than 83 weight percent E-HFO-1234ze. Also of particular note are compositions containing E-HFO-1234ze and HFC-134 and/or HFC-134a with no more than 82 weight percent E-HFO-1234ze. Also of particular note are compositions containing E-HFO-1234ze and HFC-134 and/or HFC-134a with no more than 81 weight percent E-HFO-1234ze. Also of particular note are compositions containing E-HFO-1234ze and HFC-134 and/or HFC-134a with no more than 80 weight percent E-HFO-1234ze. Also of particular note are compositions containing E-HFO-1234ze and HFC-134 and/or HFC-134a with at least 78 weight percent E-HFO-1234ze. Also of particular note are compositions containing E-HFO-1234ze and HFC-134 and/or HFC-134a with at least 76 weight percent E-HFO-1234ze. Also of particular note are compositions containing E-HFO-1234ze and HFC-134 and/or HFC-134a with at least 74 weight percent E-HFO-1234ze. Also of particular note are compositions containing E-HFO-1234ze and HFC-134 and/or HFC-134a at least 72 weight percent E-HFO-1234ze. Also of particular note are compositions containing E-HFO-1234ze and HFC-134 and/or HFC-134a at least 70 weight percent E-HFO-1234ze.

Of particular note, for use in power cycle apparatus, are compositions containing from about 35 to about 95 weight percent E-1,3,3,3-tetrafluoropropene and from about 5 to about 65 weight percent HFC-134.

Also of particular note, for use in power cycle apparatus, are azeotropic and azeotrope-like compositions containing from about 5 to about 95 weight percent E-1,3,3,3-tetrafluoropropene and from about 5 to about 95 weight percent HFC-134. Also of particular note, for use in power cycle apparatus, are azeotropic and azeotrope-like compositions containing from about 5 to about 60 weight percent E-1,3,3,3-tetrafluoropropene and from about 40 to about 95 weight percent HFC-134. Also of particular note, for use in power cycle apparatus, are azeotropic and azeotrope-like compositions containing from about 35 to about 60 weight percent E-1,3,3,3-tetrafluoropropene and from about 40 to about 65 weight percent HFC-134.

Also of particular note, for use in power cycle apparatus, are compositions containing from about 35 to about 95 weight percent E-1,3,3,3-tetrafluoropropene and from about 5 to about 65 weight percent total of HFC-134 and HFC-134a. Also of particular note, for use in power cycle apparatus, are azeotropic and azeotrope-like compositions containing from about 5 to about 95 weight percent E-1,3,3,3-tetrafluoropropene and from about 5 to about 95 weight percent total of HFC-134 and HFC-134a. Also of particular note, for use in power cycle apparatus, are azeotropic and azeotrope-like compositions containing from about 5 to about 60 weight percent E-1,3,3,3-tetrafluoropropene and from about 40 to about 95 weight percent total of HFC-134 and HFC-134a. Also of particular note, for use in power cycle apparatus, are azeotropic and azeotrope-like compositions containing from about 35 to about 60 weight percent E-1,3,3,3-tetrafluoropropene and from about 40 to about 65 weight percent total of HFC-134 and HFC-134a.

Also of particular utility in the power cycle apparatus are those embodiments wherein the working fluid has a low GWP. For GWP less than 1000, compositions containing E-HFO-1234ze and HFC-134 comprise from 11 weight percent to 99 weight percent E-HFO-1234ze and 89 weight percent to 1 weight percent HFC-134. For GWP less than 1000, compositions containing E-HFO-1234ze and HFC-134a comprise from 30.5 weight percent to 99 weight percent E-HFO-1234ze and 69.5 weight percent to 1 weight percent HFC-134a.

For GWP less than 500, compositions containing E-HFO-1234ze and HFC-134 comprise from 56 weight percent to 99 weight percent E-HFO-1234ze and 44 weight percent to 1 weight percent HFC-134. For GWP less than 500, compositions containing E-HFO-1234ze and HFC-134a comprise from 65.5 weight percent to 99 weight percent E-HFO-1234ze and 34.5 weight percent to 1 weight percent HFC-134a.

For GWP less than 150, compositions containing E-HFO-1234ze and HFC-134 comprise from 87.5 weight percent to 99 weight percent E-HFO-1234ze and 12.5 weight percent to 1 weight percent HFC-134. For GWP less than 150, compositions containing E-HFO-1234ze and HFC-134a comprise from 90 weight percent to 99 weight percent E-HFO-1234ze and 10 weight percent to 1 weight percent HFC-134a.

FIG. 1 shows a schematic of one embodiment of the ORC system for using heat from a heat source. Heat supply heat exchanger 40 transfers heat supplied from heat source 46 to the working fluid entering heat supply heat exchanger 40 in liquid phase. Heat supply heat exchanger 40 is in thermal communication with the source of heat (the communication may be by direct contact or another means). In other words, heat supply heat exchanger 40 receives heat energy from heat source 46 by any known means of thermal transfer. The ORC system working fluid circulates through heat supply heat exchanger 40 where it gains heat. At least a portion of the liquid working fluid converts to vapor in heat supply heat exchanger (e.g. evaporator) 40.

The working fluid now in vapor form is routed to expander 32 where the expansion process results in conversion of at least a portion of the heat energy supplied from the heat source into mechanical shaft power. The shaft power can be used to do any mechanical work by employing conventional arrangements of belts, pulleys, gears, transmissions or similar devices depending on the desired speed and torque required. In one embodiment, the shaft can also be connected to electric power-generating device 30 such as an induction generator. The electricity produced can be used locally or delivered to a grid.

The working fluid still in vapor form that exits expander 32 continues to condenser 34 where adequate heat rejection causes the fluid to condense to liquid.

It is also desirable to have liquid surge tank 36 located between condenser 34 and pump 38 to ensure there is always an adequate supply of working fluid in liquid form to the pump suction. The working fluid in liquid form flows to pump 38 that elevates the pressure of the fluid so that it can be introduced back into heat supply heat exchanger 40 thus completing the Rankine cycle loop.

Figure 2:
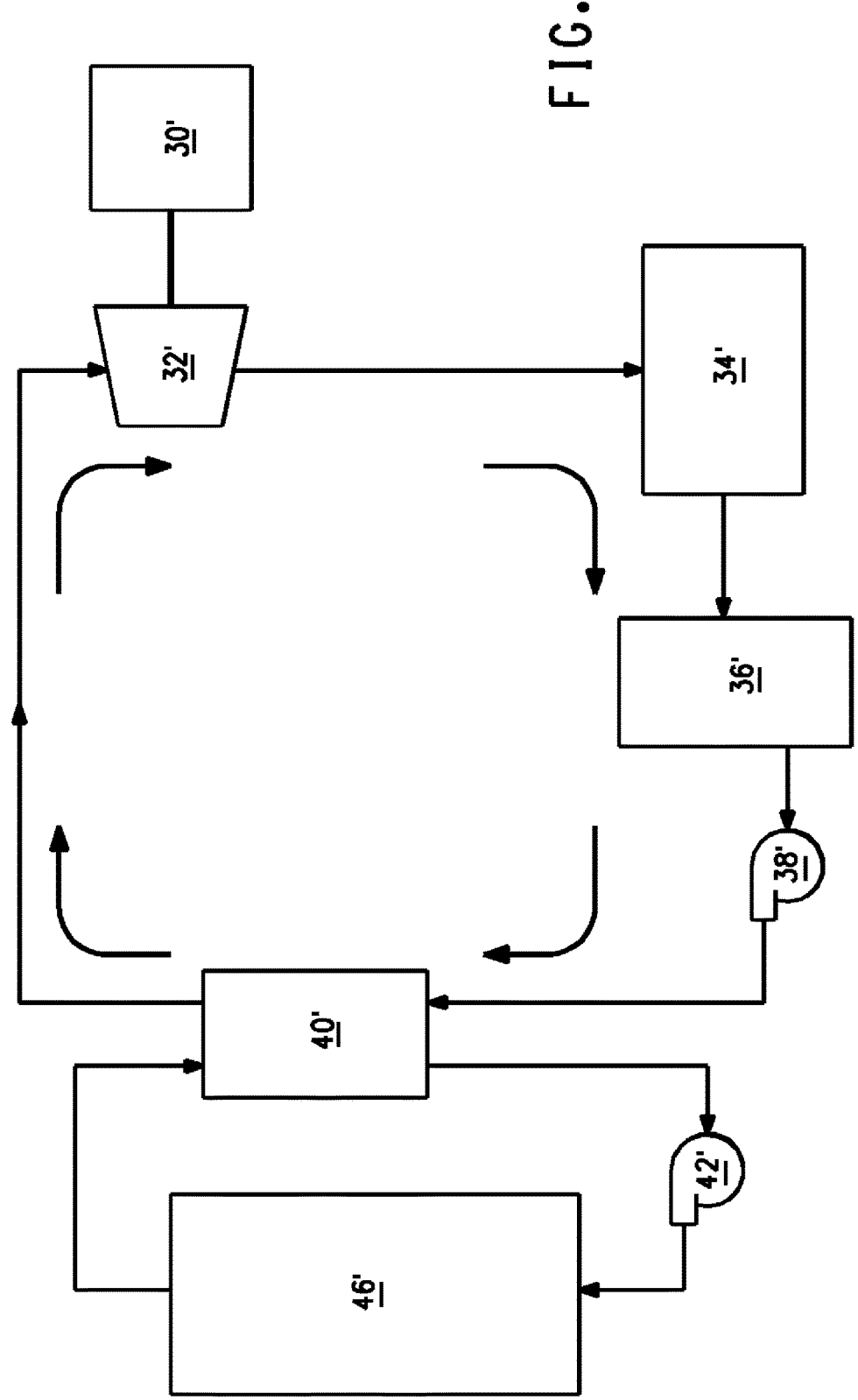
FIG. 2 is a block diagram of a heat source and an organic Rankine cycle system which uses a secondary loop configuration to provide heat from a heat source to a heat exchanger for conversion to mechanical energy according to the present invention.

In an alternative embodiment, a secondary heat exchange loop operating between the heat source and the ORC system can also be used. In FIG. 2, an organic Rankine cycle system is shown, in particular for a system using a secondary heat exchange loop. The main organic Rankine cycle operates as described above for FIG. 1. The secondary heat exchange loop is shown in FIG. 2 as follows: the heat from heat source 46' is transported to heat supply heat exchanger 40' using a heat transfer medium (i.e., secondary heat exchange loop fluid). The heat transfer medium flows from heat supply heat exchanger 40' to pump 42' that pumps the heat transfer medium back to heat source 46'. This arrangement offers another means of removing heat from the heat source and delivering it to the ORC system.

In fact, the working fluids of this invention can be used as secondary heat exchange loop fluids provided the pressure in the loop is maintained at or above the fluid saturation pressure at the temperature of the fluid in the loop. Alternatively, the working fluids of this invention can be used as secondary heat exchange loop fluids or heat carrier fluids to extract heat from heat sources in a mode of operation in which the working fluids are allowed to evaporate during the heat exchange process thereby generating large fluid density differences sufficient to sustain fluid flow (thermosyphon effect). Additionally, high-boiling point fluids such as glycols, brines, silicones, or other essentially non-volatile fluids may be used for sensible heat transfer in the secondary loop arrangement described. A secondary heat exchange loop can make servicing of either the heat source or the ORC system easier since the two systems can be more easily isolated or separated. This approach can simplify the heat exchanger design as compared to the case of having a heat exchanger with a high mass flow/low heat flux portion followed by a high heat flux/low mass flow portion.

Organic compounds often have an upper temperature limit above which thermal decomposition will occur. The onset of thermal decomposition relates to the particular structure of the chemical and thus varies for different compounds. In order to access a high-temperature source using direct heat exchange with the working fluid, design considerations for heat flux and mass flow, as mentioned above, can be employed to facilitate heat exchange while maintaining the working fluid below its thermal decomposition onset temperature. Direct heat exchange in such a situation typically requires additional engineering and mechanical features which drive up cost. In such situations, a secondary loop design may facilitate access to the high-temperature heat source by managing temperatures while circumventing the concerns enumerated for the direct heat exchange case.

Other ORC system components for the secondary heat exchange loop embodiment are essentially the same as described for FIG. 1. In FIG. 2, Liquid pump 42' circulates the secondary fluid (e.g., heat transfer medium) through the secondary loop so that it enters the portion of the loop in heat source 46' where it gains heat. The fluid then passes to heat exchanger 40' where the secondary fluid gives up heat to the ORC working fluid.

In one embodiment of the above process, the evaporator temperature (temperature at which heat is extracted by the working fluid) is less than the critical temperature of the working fluid. Included are embodiments wherein the temperature of operation is any one of the following temperatures or within the range (inclusive) defined by any two numbers below:

about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, and about 119° C.

In one embodiment of the above process, the evaporator operating pressure is less than about 2.2 MPa. Included are embodiments wherein the pressures of operation is any one of the following pressures or within the range (inclusive) defined by any two numbers below:

about 0.15, 0.2, 0. 25, 0.3, 0.35, 0.4, 0.45, 0.5, 0.55, 0.6, 0.65, 0.7, 0.75, 0.8, 0.85, 0.9, 0.95, 1.00, 1.05, 1.10, 1.15, 1.20, 1.25, 1.30, 1.35, 1.40, 1.45, 1.50, 1.55, 1.60, 1.65, 1.70, 1.75, 1.80, 1.85, 1.90, 1.95, 2.00, 2.05, 2.10, 2.15, 2.20, 2.25, 2.30, 2.35, 2.40, 2.45, 2.50, 2.55, 2.60, 2.65, 2.70, 2.75, 2.80, 2.85, 2.90, 2.95, 3.00, 3.05, 3.10, 3.15, 3.20, 3.25, 3.30, 3.35, 3.40, 3.45, 3.50, 3.55, 3.60, 3.65, 3.70, 3.75, 3.80, 3.85, 3.90, 3.95, 4.00, 4.05, 4.10, 4.15, 4.20, 4.25, 4.30, 4.35, 4.40, 4.45, 4.50, 4.55, and about 4.60 MPa.

The use of low cost equipment components substantially expands the practical viability of organic Rankine cycles. For example, limiting the maximum evaporating pressure to about 2.2 MPa would allow the use of low-cost equipment components of the type widely used in the HVAC industry.

Of particular note are power cycle apparatus containing a working fluid comprising or consisting essentially of E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a).

Also of particular note are power cycle apparatus containing a working fluid comprising or consisting essentially of E-1,3,3,3-tetrafluoropropene (E-HFO-1234ze) and 1,1,2,2-tetrafluoroethane (HFC-134).

Also of particular note are power cycle apparatus containing a working fluid comprising or consisting essentially of E-1,3,3,3-tetrafluoropropene (E-HFO-1234ze), 1,1,2,2-tetrafluoroethane (HFC-134), and 1,1,1,2-tetrafluoroethane (HFC-134a).

Of particular utility are non-flammable working fluids comprising mixtures of E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) with GWP less than 150. Also of particular utility are non-flammable working fluids comprising mixtures of E-1,3,3,3-tetrafluoropropene (E-HFO-1234ze) and 1,1,2,2-tetrafluoroethane (HFC-134) with GWP less than 150. Also of particular utility are non-flammable working fluids comprising mixtures of E-1,3,3,3-tetrafluoropropene (E-HFO-1234ze), 1,1,2,2-tetrafluoroethane (HFC-134), and 1,1,1,2-tetrafluoroethane (HFC-134a) with GWP less than 150.

The apparatus may include molecular sieves to aid in removal of moisture. Desiccants may be composed of activated alumina, silica gel, or zeolite-based molecular sieves. In some embodiments, the molecular sieves are most useful with a pore size of approximately 3 Angstroms, 4 Angstroms, or 5 Angstroms. Representative molecular sieves include MOLSIV XH-7, XH-6, XH-9 and XH-11 (UOP LLC, Des Plaines, Ill.).

Power Cycle Compositions

In some embodiments, the compositions comprising E-1,3,3,3-tetrafluoropropene (E-HFO-1234ze) and at least one compound selected from 1,1,2,2-tetrafluoroethane (HFC-134) and 1,1,1,2-tetrafluoroethane (HFC-134a) that are particularly useful in power cycles including organic Rankine cycles are azeotropic or azeotrope-like.

It has been disclosed that E-1,3,3,3-tetrafluoropropene and HFC-134 as well as E-1,3,3,3-tetrafluoropropene and HFC-134a form azeotropic and azeotrope-like compositions in U.S. Published Patent Application 20060243944(A1).

Azeotropic compositions will have zero glide in the heat exchangers, e.g., evaporator and condenser (or working fluid cooler), of a power cycle apparatus.

In accordance with this invention, a working fluid comprising an azeotropic or azeotrope-like combination of E-1,3,3,3-tetrafluoropropene (E-HFO-1234ze), 1,1,2,2-tetrafluoroethane (HFC-134), and 1,1,1,2-tetrafluoroethane (HFC-134a) is provided. The azeotropic or azeotrope-like combination comprises from about 1 weight percent to about 98 weight percent E-HFO-1234ze, from about 1 weight percent to about 98 weight percent HFC-134 and from about 1 weight percent to about 98 weight percent HFC-134a.

In one embodiment is provided a composition suitable for use in organic Rankine apparatus, comprising a working fluid containing E-HFO-1234ze, HFC-134a, and HFC-134 and a lubricant.

In one embodiment, any of the compositions disclosed herein may be used in combination with at least one lubricant selected from the group consisting of polyalkylene glycols, polyol esters, polyvinylethers, polycarbonates, perfluoropolyethers, mineral oils, alkylbenzenes, synthetic paraffins, synthetic naphthenes, poly(alpha)olefins and combinations thereof.

In some embodiments, lubricants useful in combination with the compositions as disclosed herein may comprise those suitable for use with power cycle apparatus, including organic Rankine cycle apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), naphthenic mineral oil commercially available from Crompton Co. under the trademarks Suniso® 3GS and Suniso® 5GS, naphthenic mineral oil commercially available from Pennzoil under the trademark Sontex® 372LT, naphthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil). Perfluoropolyether (PFPE) lubricants include those sold under the trademark Krytox® by E. I. du Pont de Nemours; sold under the trademark Fomblin® by Ausimont; or sold under the trademark Demnum® by Daikin Industries.

In other embodiments, lubricants may also comprise those which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

In another embodiment is provided composition suitable for use in organic Rankine apparatus, comprising a working fluid containing E-HFO-1234ze, HFC-134 and HFC-134a and at least one other component selected from the group consisting of stabilizers, compatibilizers and tracers.

Optionally, in another embodiment, certain refrigeration, air-conditioning, or heat pump system additives may be added, as desired, to the working fluids as disclosed herein in order to enhance performance and system stability. These additives are known in the field of refrigeration and air-conditioning, and include, but are not limited to, anti-wear agents, extreme pressure lubricants, corrosion and oxidation inhibitors, metal surface deactivators, free radical scavengers, and foam control agents. In general, these additives may be present in the working fluids in small amounts relative to the overall composition. Typically concentrations of from less than about 0.1 weight percent to as much as about 3 weight percent of each additive are used. These additives are selected on the basis of the individual system requirements. These additives include members of the triaryl phosphate family of EP (extreme pressure) lubricity additives, such as butylated triphenyl phosphates (BTPP), or other alkylated triaryl phosphate esters, e.g. Syn-O-Ad 8478 from Akzo Chemicals, tricresyl phosphates and related compounds. Additionally, the metal dialkyl dithiophosphates (e.g., zinc dialkyl dithiophosphate (or ZDDP); Lubrizol 1375 and other members of this family of chemicals may be used in compositions of the present invention. Other anti-wear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodecyl succinic acid (DDSA), amine phosphate (AP), oleoyl sarcosine, imidazone derivatives and substituted sulfphonates. Metal surface deactivators include areoxalyl bis (benzylidene) hydrazide, N,N'-bis(3,5-di-tert-butyl-4-hydroxyhydrocinnamoylhydrazine, 2,2,'-oxamidobis-ethyl-(3, 5-di-tert-butyl-4-hydroxyhydrocinnamate, N,N'-(disalicyclidene)-1,2-diaminopropane and ethylenediaminetetraacetic acid and its salts, and mixtures thereof.

Of note are stabilizers to prevent degradation at temperatures of 50° C. or above. Also of note are stabilizers to prevent degradation at temperatures of 75° C. or above. Also of note are stabilizers to prevent degradation at temperatures of 85° C. or above. Also of note are stabilizers to prevent degradation at temperatures of 100° C. or above. Also of note are stabilizers to prevent degradation at temperatures of 118° C. or above. Also of note are stabilizers to prevent degradation at temperatures of 137° C. or above.

Of note are stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and iso-decyl diphenyl phosphite, commercially available from Ciba under the trademark Irgafos® DDPP; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy)methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2(3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl) succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

Tracers that may be included in the working fluid compositions may be selected from the group consisting of hydrofluorocarbons (HFCs), deuterated hydrofluorocarbons, perfluorocarbons, fluoroethers, brominated compounds, iodated compounds, alcohols, aldehydes and ketones, nitrous oxide and combinations thereof.

The compositions of the present invention can be prepared by any convenient method including mixing or combining the desired amounts. In one embodiment of this invention, a composition can be prepared by weighing the desired component amounts and thereafter combining them in an appropriate container.

EXAMPLES

The concepts described herein will be further described in the following examples, which do not limit the scope of the invention described in the claims.

Example 1

Power Generation Through Subcritical Rankine Cycle Using an E-HFO-1234ze/HFC-134 Blend as the Working Fluid Heat at temperatures up to about 100° C. is abundantly available from various sources. It can be captured as a byproduct from various industrial processes, it can be collected from solar irradiation through solar panels or it can be extracted from geological hot water reservoirs through shallow or deep wells. Such heat can be converted to mechanical or electrical power for various uses through Rankine cycles using E-HFO-1234ze/HFC-134 (or E-HFO-1234ze/HFC-134/HFC-134a) blends as the working fluid.

Table 1 compares the basic properties of an E-HFO-1234ze/HFC-134 blend containing 65 wt % E-HFO-1234ze (Blend A) to those of HFC-134a. HFC-134a was selected as a reference fluid because it has been extensively used as a working fluid for Rankine cycles using heat at temperatures up to about 100° C. Blend A retains the attractive safety properties of HFC-134a, i.e. low toxicity and non-flammability. Moreover, Blend A has a GWP100 lower than that of HFC-134a by 72.8%

TABLE 1

Basic properties of an E-HFO-1234ze/HFC-134 blend containing 65 wt % E-HFO-1234ze compared to those of HFC-134a.

|  | HFC-134a | Blend A |
|---|---|---|
| Chemical Identity | $CH_2FCF_3$ | E-HFO-1234ze/HFC-134 [65/35 wt %] |
| Toxicity Class (ASHRAE Standard 34) | A | A(*) |
| Flammability Class (ASHRAE Standard 34) | 1 (non-flammable) | 1(*) (non-flammable) |
| ODP | None | None |
| $GWP_{100}$ | 1,430 | 389 |
| $T_{cr}$ [° C.] | 101.1 | 111.6 |
| $P_{cr}$ [MPa] | 4.06 | 3.96 |
| $T_b$ [° C.] | −26.1 | −20.5 |
| Glide [° C.] | N/A | Negligible |

(*)estimated

Table 2 compares the performance of Rankine cycles operating with Blend A to Rankine Cycles operating with HFC-134a. All cycles are assumed to be operating at the following conditions:

| $T_{cond}$ [C.] | 35 |
|---|---|
| Superh [C.] | 10 |
| Subc [C.] | 5 |
| Expander Efficiency | 0.8 |
| Liquid Pump Efficiency | 0.7 |

TABLE 2

Performance of Rankine cycles operating with Blend A to Rankine Cycles operating with HFC-134a

| | Column No. | | | | | | |
|---|---|---|---|---|---|---|---|
| | 1 HFC-134a | 2 Blend A | 3 Blend A vs HFC-134a % | 4 HFC-134a | 5 Blend A | 6 Blend A vs HFC-134a % | 7 Blend A |
| $T_{evap}$ [C.] | 80 | 80 | | 90 | 90 | | 100 |
| Evaporator Glide [° C.] | N/A | 0.08 | | N/A | 0.08 | | 0.06 |
| Condenser Glide [° C.] | N/A | 0.08 | | N/A | 0.08 | | 0.08 |
| $P_{evap}$ [MPa] | 2.64 | 2.12 | | 3.25 | 2.61 | | 3.19 |
| Net Work from Cycle [kJ/kg] | 15.98 | 16.34 | | 18.01 | 18.81 | | 20.73 |
| Cycle Energy Efficiency [%] | 7.79 | 7.97 | 2.31 | 8.78 | 9.07 | 3.30 | 9.95 |

Figure 3:
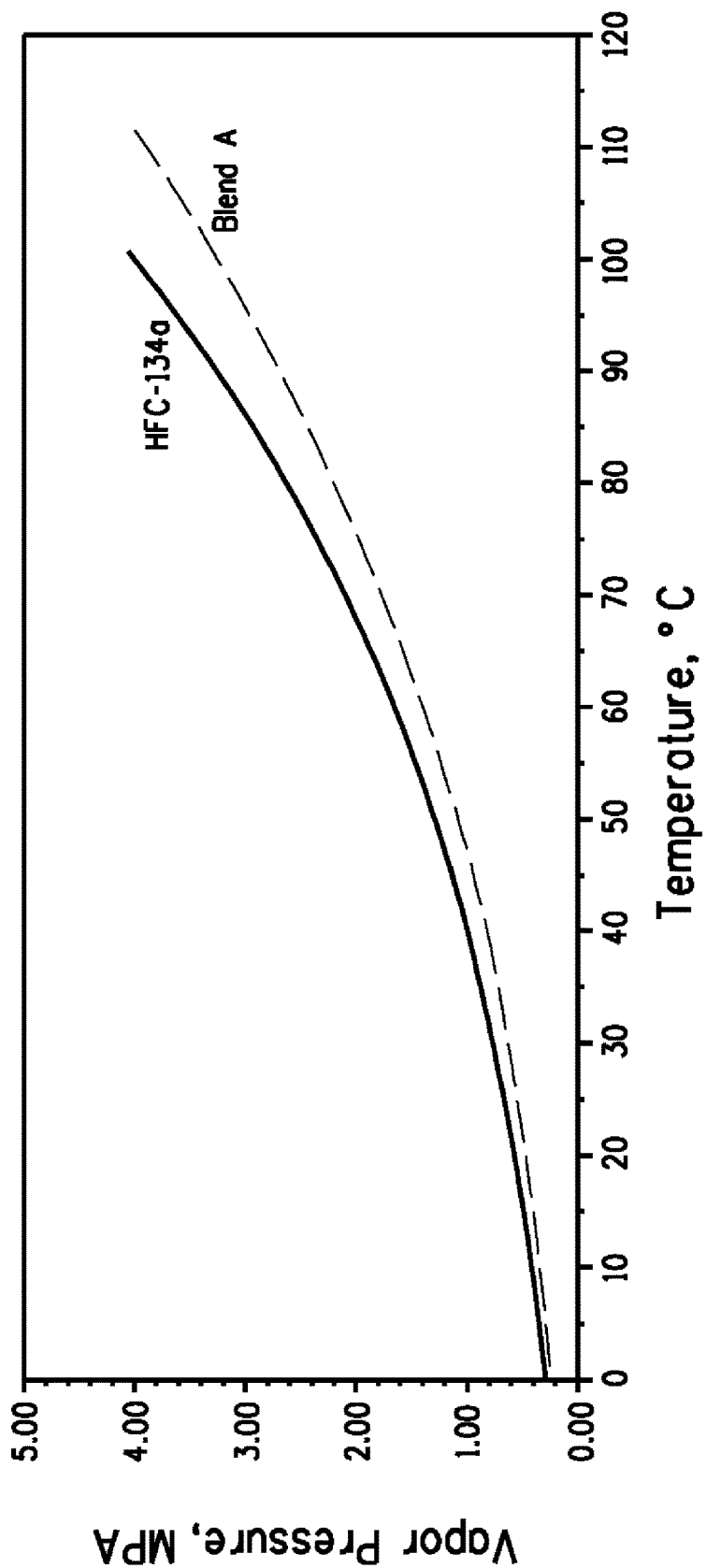

Columns 1, 2 and 3 of Table 2 indicate that Blend A, could enable Rankine cycles for the utilization of heat at temperatures that would allow an evaporating temperature of 80° C. (and an expander inlet temperature of 90° C.) with energy efficiency 2.31% higher than HFC-134a. The lower evaporating temperature with Blend A would also be advantageous. FIG. 3 shows that the vapor pressure of Blend A at temperatures higher than about 80° C. is substantially lower than that of HFC-134a.

Columns 4, 5 and 6 of Table 2 indicate that Blend A, could enable Rankine cycles for the utilization of heat at temperatures that would allow an evaporating temperature of 90° C. (and an expander inlet temperature of 100° C.) with energy efficiency 3.30% higher than HFC-134a.

The higher critical temperature of Blend A relative to HFC-134a allows the use of heat in conventional subcritical Rankine cycles at temperatures higher than those feasible with HFC-134a. Column 7 of Table 2 shows the performance of a Rankine cycle operating with Blend A as the working fluid for the utilization of heat at temperatures that would allow an evaporating temperature of 100° C. (and an expander inlet temperature of 110° C.). Use of HFC-134a in a conventional subcritical Rankine cycle would not be practical at an evaporating temperature of 100° C. because of the close proximity of the evaporating temperature to the critical temperature of HFC-134a. The cycle energy efficiency with Blend A (9.95%) is 13.33% higher than the highest energy efficiency that can be achieved with HFC-134a (8.78%, Table 2, column 4) with conventional subcritical Rankine cycles operating at evaporating temperatures lower than the critical temperatures of their working fluids by at least about 10° C. (or at reduced evaporating temperatures lower than about 0.97). In summary, replacing HFC-134a with blend A would allow higher energy efficiencies especially when the available heat source allows the evaporating temperature to be increased, in addition to reducing the GWP of the working fluid.

Example 2

Chemical Stability of E-HFO-1234ze and HFC-134 at 250° C.

The chemical stability of E-HFO-1234ze in the presence of metals was tested according to the sealed tube testing methodology of ANSI/ASHRAE Standard 97-2007. The stock of E-HFO-1234ze used in the sealed tube tests was about 99.98 wt % pure and contained virtually no water or air.

Sealed glass tubes, each containing three metal coupons made of steel, copper, and aluminum immersed in E-HFO-1234ze, were aged in a heated oven at 250° C. for 7 or 14 days. Visual inspection of the tubes after thermal aging indicated clear liquids with no discoloration or other visible deterioration of the fluid. Moreover, there was no change in the appearance of the metal coupons indicating corrosion or other degradation. The concentration of fluoride ion in the aged liquid samples, measured by ion chromatography, was 15.15 ppm after two weeks of aging at 250° C. The concentration of fluoride ion can be interpreted as an indicator of the degree of E-HFO-1234ze degradation. Therefore, E-HFO-1234ze degradation was minimal.

Table 3 shows compositional changes of E-HFO-1234ze samples after aging in the presence of steel, copper and aluminum at 250° C. for one or two weeks. The conversion of E-HFO-1234ze even after two weeks of aging was minimal. Isomerization of E-HFO-1234ze produced 963.2 ppm of the cis or E isomer of HFO-1234ze. Although the thermodynamic properties of HFO-1234ze-Z are significantly different than those of E-HFO-1234ze, the thermodynamic properties of an E-HFO-1234ze/HFO-1234ze-Z blend containing only 963.2 ppm of HFO-1234ze-Z would be virtually identical to the thermodynamic properties of pure E-HFO-1234ze.

Only negligible proportions of new unknown compounds appeared even after two weeks of aging at 250° C.

TABLE 3

Changes in E-HFO-1234ze sample composition (quantified by GCMS peak areas) after aging in the presence of steel, copper and aluminum coupons at 250° C. for one and two weeks.

| | | Initial (Non-Aged) Stock of E-HFO-1234ze | After one week of aging | After two weeks of aging |
|---|---|---|---|---|
| E-HFO-1234ze | [%] | 99.97684 | 99.92775 | 99.83044 |
| Z-HFO-1234ze | [ppm] | 1.0 | 196.1 | 963.2 |
| HFO-1234 | [ppm] | 4.5 | 131.4 | 188.4 |
| Unknown compounds eluting after E-HFO-1234ze | [ppm] | <1 | 154 | 295 |

The chemical stability of HFC-134 was also tested following procedures similar to those described above for E-HFO-1234ze. The fluoride ion concentration in HFC-134 samples aged in the presence of steel, copper, and aluminum at 250° C. for two weeks was below the measurement method detection limit (0.15 ppm), indicating a high level of stability at this temperature.

Example 3

Power Generation through Transcritical Rankine Cycle Using an E-HFO-1234ze/HFC-134 Blend as the Working Fluid This example demonstrates the generation of power from heat through Rankine Cycles using working fluids containing E-HFO-1234ze and HFC-134 under transcritical cycle conditions. The evidence provided in example 2 above strongly suggests that E-HFO-1234ze and HFC-134 blends can remain chemically stable at temperatures substantially higher than their critical temperatures. Therefore, working fluids comprising E-HFO-1234ze and HFC-134 can enable Rankine cycles that collect heat at temperatures and pressures at which the working fluids containing HFO-1234ze and HFC-134 can be in a supercritical state. Use of higher temperature heat sources can lead to higher cycle energy efficiencies (and volumetric capacities for power generation) relative to the use of lower temperature heat sources.

When a supercritical fluid heater is used instead of the evaporator (or boiler) of the conventional subcritical Rankine cycle, the heater pressure and the heater exit temperature (or equivalently the expander inlet temperature) must be specified. Table 4 summarizes the performance of a Rankine cycle with a blend containing 65 wt % E-HFO-1234ze and 35 wt % HFC-134 as the working fluid. Operating the supercritical fluid heater at a pressure of 8 MPa and a heater exit temperature (or expander inlet temperature) of 250° C. achieves a Rankine cycle energy efficiency of 14.9%. Higher operating pressures in the supercritical fluid heater would necessitate the use of more robust equipment.

TABLE 4

Performance of a trans-critical Rankine Cycle with a 65/35 wt % E-HFO-1234ze/HFC-134 blend as the working fluid

| | |
|---|---|
| Supercritical Fluid Heater Pressure | 8 MPa |
| Expander Inlet Temperature | 250.00° C. |
| Condenser Temperature | 35.00° C. |
| Subcooling | 5.00 K |
| Expander Efficiency | 0.80 |
| Liquid Pump Efficiency | 0.70 |
| Expander Outlet Temperature | 159.98° C. |
| Expander Outlet Pressure | 0.71 MPa |
| Net Work from Rankine Cycle | 52.09 kJ/kg |
| Efficiency Rankine Cycle | 14.9% |
| Volumetric Capacity for Power Generation | 1,167.83 kJ/m$^3$ |

Example 4

Impact of Vapor Leakage

A vessel is charged with an initial composition at a temperature of about 25° C., and the initial vapor pressure of the composition is measured. The composition is allowed to leak from the vessel, while the temperature is held constant, until 50 weight percent of the initial composition is removed, at which time the vapor pressure of the composition remaining in the vessel is measured. Data are shown in Table 5.

TABLE 5

| Composition wt % | Initial P (Psia) | Initial P (kPa) | After 50% Leak (Psia) | After 50% Leak (kPa) | Delta P (%) |
|---|---|---|---|---|---|
| HFC-134/HFC-134a/E-HFO-1234ze | | | | | |
| 1/1/98 | 72.68 | | 72.57 | | 0.2% |
| 1/98/1 | 96.10 | | 96.07 | | 0.0% |
| 98/1/1 | 76.47 | | 76.42 | | 0.1% |
| 10/10/80 | 77.24 | | 76.54 | | 0.9% |
| 10/80/10 | 93.22 | | 92.92 | | 0.3% |
| 80/10/10 | 79.31 | | 78.98 | | 0.4% |
| 20/20/60 | 81.15 | | 80.39 | | 0.9% |
| 20/60/20 | 89.79 | | 89.26 | | 0.6% |
| 60/20/20 | 81.95 | | 81.49 | | 0.6% |
| 25/25/50 | 82.71 | | 82.01 | | 0.8% |
| 25/50/25 | 87.97 | | 87.37 | | 0.7% |
| 50/25/25 | 83.09 | | 82.59 | | 0.6% |
| 30/30/40 | 84.03 | | 83.39 | | 0.8% |
| 30/40/30 | 86.08 | | 85.46 | | 0.7% |
| 40/30/30 | 84.14 | | 83.58 | | 0.7% |
| 15/15/70 | 79.33 | | 78.56 | | 1.0% |
| 15/70/15 | 91.53 | | 91.11 | | 0.5% |
| 70/15/15 | 80.69 | | 80.28 | | 0.5% |

The data for compositions containing E-HFO-1234ze, HFC-134 and HFC-134a as listed in Table 5 demonstrates azeotrope-like behavior wherein remaining after 50 weight percent is removed the change in vapor pressure is less than about 10 percent.

Example 5

Performance of an Organic Rankine Cycle With the Non-flammable HFO-1234ze-E/HFC-134 (63/37wt %) Blend as the Working Fluid Relative to Neat HFO-1234ze-E The following table compares the performance of an ORC with the non-flammable (according to ASHRAE Standard 34) HFO-1234ze-E/HFC-134 (63/37wt %) blend as the working fluid relative to neat HFO-1234ze-E:

TABLE 6

| | HFO-1234ze-E | Blend B | Blend B vs. E-HFO-1234ze (%) |
|---|---|---|---|
| E-HFO-1234ze (wt %) | 100 | 63 | |
| HFC-134 (wt %) | 0 | 37 | |
| GWP$_{100}$ (AR4) | 6 | 411 | |
| Evaporator Temperature (C.) | 90 | 90 | |
| Condenser Temperature (C.) | 20 | 20 | |
| Pump Efficiency | 0.65 | 0.65 | |
| Turbine Efficiency | 0.75 | 0.75 | |
| Superheat (K) | 5 | 5 | |
| Subcooling (K) | 0 | 0 | |
| Pressure, evaporator (MPa) | 2.47 | 2.62 | |
| Pressure, condenser (MPa) | 0.43 | 0.45 | |
| Pump Work (kJ/kg) | 2.95 | 3.01 | 2.0 |
| Expander Work (kJ/kg) | 25.08 | 26.09 | 4.0 |
| Net Work | 22.13 | 23.08 | 4.3 |
| Thermal Efficiency | 0.107 | 0.108 | 0.7 |

TABLE 6-continued

|  | HFO-1234ze-E | Blend B | Blend B vs. E-HFO-1234ze (%) |
|---|---|---|---|
| Volumetric Capacity (kJ/m$^3$) | 461.7 | 494.5 | 7.1 |
| Evaporator Glide (K) |  | 0.07 |  |
| Condenser Glide (K) |  | 0.07 |  |

Blend B offers non-flammability (according to ASHRAE Standard 34) and better performance than HFO-1234ze-E (higher efficiency and volumetric capacity) while still achieving a relatively low GWP.

Example 6

Performance of an Organic Rankine Cycle With the Non-flammable HFO-1234ze-E/HFC-134 (35/65wt %) Blend as the Working Fluid Relative to Neat HFO-1234ze-E The following table compares the performance of an ORC with the non-flammable (according to ASHRAE Standard 34) HFO-1234ze-E/HFC-134 (35/65wt %) blend as the working fluid relative to neat HFO-1234ze-E:

TABLE 7

|  | HFO-1234ze-E | Blend C | Blend C vs. HFO-1234ze-E (%) |
|---|---|---|---|
| E-HFO-1234ze (wt %) | 100 | 35 |  |
| HFC-134 (wt %) | 0 | 65 |  |
| GWP$_{100}$ (AR4) | 6 | 717 |  |
| Evaporator Temperature (C.) | 90 | 90 |  |
| Condenser Temperature (C.) | 20 | 20 |  |
| Pump Efficiency | 0.65 | 0.65 |  |
| Turbine Efficiency | 0.75 | 0.75 |  |
| Superheat (K) | 5 | 5 |  |
| Subcooling (K) | 0 | 0 |  |
| Pressure, evaporator (MPa) | 2.47 | 2.68 |  |
| Pressure, condenser (MPa) | 0.43 | 0.46 |  |
| Pump Work (kJ/kg) |  | 0.01 |  |
| Expander Work (kJ/kg) |  | 0 |  |
| Net Work | 2.95 | 2.97 | 0.8 |
| Thermal Efficiency | 25.08 | 27.20 | 8.5 |
| Volumetric Capacity (kJ/m$^3$) | 22.13 | 24.23 | 9.5 |
| Evaporator Glide (K) | 0.107 | 0.109 | 1.9 |
| Condenser Glide (K) | 461.7 | 509.7 | 10.4 |

Blend C offers non flammability (according to ASHRAE Standard 34) and better performance than HFO-1234ze-E (higher efficiency and volumetric capacity) while still achieving a relatively low GWP (relative to many incumbent working fluids).

Example 7

Performance of an Organic Rankine Cycle With the HFO-1234ze-E/HFC-134 (95/5wt %) Blend as the Working Fluid Relative to Neat HFO-1234ze-E The following table compares the performance of an ORC with the HFO-1234ze-E/HFC-134 (95/5wt %) blend as the working fluid relative to neat HFO-1234ze-E:

TABLE 8

|  | HFO-1234ze-E | Blend D | Blend D vs. HFO-1234ze-E |
|---|---|---|---|
| E-HFO-1234ze (wt %) | 100 | 95 |  |
| HFC-134 (wt %) | 0 | 5 |  |
| GWP$_{100}$ (AR4) | 6 | 61 |  |
| Evaporator Temperature (C.) | 90 | 90 |  |
| Condenser Temperature (C.) | 20 | 20 |  |
| Pump Efficiency | 0.65 | 0.65 |  |
| Turbine Efficiency | 0.75 | 0.75 |  |
| Superheat (K) | 5 | 5 |  |
| Subcooling (K) | 0 | 0 |  |
| Pressure, evaporator (MPa) | 2.47 | 2.49 |  |
| Pressure, condenser (MPa) | 0.43 | 0.43 |  |
| Pump Work (kJ/kg) | 2.95 | 2.97 | 0.5 |
| Expander Work (kJ/kg) | 25.08 | 25.19 | 0.4 |
| Net Work | 22.13 | 22.22 | 0.4 |
| Thermal Efficiency | 0.107 | 0.107 | 0.0 |
| Volumetric Capacity (kJ/m$^3$) | 461.7 | 466.9 | 1.1 |
| Evaporator Glide (K) |  | 0.04 |  |
| Condenser Glide (K) |  | 0.06 |  |

Blend D offers higher volumetric capacity than 1234ze-E while still achieving a low GWP relatively to many incumbent working fluids.

Example 8

Performance of an Organic Rankine Cycle With the Non-flammable HFO-1234ze-E/HFC-134a (55/45wt %) Blend as the Working Fluid Relative to Neat HFO-1234ze-E The following table compares the performance of an ORC with the non-flammable (according to ASHRAE Standard 34) HFO-1234ze-E/HFC-134a (55/45wt %) blend as the working fluid relative to neat E-HFO-1234ze:

TABLE 9

|  | HFO-1234ze-E | Blend E | Blend E vs. HFO-1234ze-E |
|---|---|---|---|
| E-HFO-1234ze (wt %) | 100 | 55 |  |
| HFC-134a (wt %) | 0 | 45 |  |
| GWP$_{100}$ (AR4) | 6 | 646.8 |  |
| Evaporator Temperature (C.) | 90 | 90 |  |
| Condenser Temperature (C.) | 20 | 20 |  |
| Pump Efficiency | 0.65 | 0.65 |  |
| Turbine Efficiency | 0.75 | 0.75 |  |
| Superheat (K) | 5 | 5 |  |
| Subcooling (K) | 0 | 0 |  |
| Pressure, evaporator (MPa) | 2.47 | 2.87 |  |
| Pressure, condenser (MPa) | 0.43 | 0.51 |  |
| Pump Work (kJ/kg) | 2.95 | 3.43 | 16.3 |
| Expander Work (kJ/kg) | 25.08 | 25.08 | 0.0 |
| Net Work | 22.13 | 21.65 | −2.2 |
| Thermal Efficiency | 0.107 | 0.105 | −2.2 |
| Volumetric Capacity (kJ/m$^3$) | 461.7 | 524.9 | 13.7 |
| Evaporator Glide (K) |  | 0.41 |  |
| Condenser Glide (K) |  | 0.65 |  |

Blend E offers higher volumetric capacity than 1234ze-E while still achieving a low GWP relatively to many incumbent working fluids.

Example 9

Performance of an Organic Rankine Cycle With the Non-flammable HFO-1234ze-E/HFC-134a (70/30wt %) Blend as the Working Fluid Relative to Neat HFO-1234ze-E The following table compares the performance of an ORC with the non-flammable (according to ASTM E-681 at 60°

C.) HFO-1234ze-E/HFC-134a (70/30wt %) blend as the working fluid relative to neat HFO-1234ze-E:

TABLE 10

|  | HFO-1234ze-E | Blend F | Blend F vs. HFO-1234ze-E (%) |
|---|---|---|---|
| E-HFO-1234ze (wt %) | 100 | 70 |  |
| HFC-134a (wt %) | 0 | 30 |  |
| GWP$_{100}$ (AR4) | 6 | 433.2 |  |
| Critical Temperature (C.) | 110.2 |  |  |
| Critical Pressure (MPa) | 3.66 |  |  |
| Evaporator Temperature (C.) | 90 |  |  |
| Condenser Temperature (C.) | 20 |  |  |
| Pump Efficiency | 0.65 |  |  |
| Turbine Efficiency | 0.75 |  |  |
| Superheat (K) | 5 |  |  |
| Subcooling (K) | 0 |  |  |
| Pressure, evaporator (MPa) | 2.47 | 2.75 |  |
| Pressure, condenser (MPa) | 0.43 | 0.48 |  |
| Pump Work (kJ/kg) | 2.95 | 3.28 | 11.2 |
| Expander Work (kJ/kg) | 25.08 | 25.05 | −0.1 |
| Net Work | 22.13 | 21.77 | −1.7 |
| Thermal Efficiency | 0.107 | 0.105 | −1.6 |
| Volumetric Capacity (kJ/m$^3$) | 461.7 | 505.7 | 9.5 |
| Evaporator Glide (K) |  | 0.45 |  |
| Condenser Glide (K) |  | 0.72 |  |

Blend F offers non-flammability (according to ASTM E-681 at 60° C.) higher volumetric capacity than 1234ze-E while still achieving a low GWP relatively to many incumbent working fluids.

Example 10

Performance of an Organic Rankine Cycle With the Non-flammable HFO-1234ze-E/HFC-134/HFC-134a (35/16/49 wt %) blend as the Working Fluid Relative to Neat HFO-1234ze-E The following table compares the performance of an ORC with the non-flammable (according to ASHRAE Standard 34) HFO-1234ze-E/HFC-134/HFC-134a (35/16/49 wt %) blend as the working fluid relative to neat HFO-1234ze-E:

TABLE 11

|  | HFO-1234ze-E | Blend G | Blend G vs. HFO-1234ze-E |
|---|---|---|---|
| HFO-1234ze-E (wt %) | 100 | 35 |  |
| HFC-134 (wt %) | 0 | 16 |  |
| HFC-134a (wt %) | 0 | 49 |  |
| GWP$_{100}$ | 6 | 878.8 |  |
| Evaporator Temperature (C.) | 90 | 90 |  |
| Condensor Temperature (C.) | 20 | 20 |  |
| Pump Efficiency | 0.65 | 0.65 |  |
| Expander Efficiency | 0.75 | 0.75 |  |
| Superheat (K) | 5 | 5 |  |
| Subcooling (K) | 0 | 0 |  |
| Pressure evaporator (MPa) | 2.47 | 2.94 |  |
| Pressure condenser (MPa) | 0.43 | 0.52 |  |
| Pump Work (kJ/kg) | 2.9505 | 3.4525 | 17.0 |
| Expander Work (kJ/kg) | 25.0815 | 25.6947 | 2.4 |
| Net Work | 22.131 | 22.2422 | 0.5 |
| Thermal Efficiency | 0.107 | 0.1053 | −1.6 |
| Volumetric Capacity (kJ/m$^3$) | 461.7 | 540.2 | 17.0 |
| Evaporator Glide (K) |  | 0.28 |  |
| Condenser Glide (K) |  | 0.40 |  |

Blend G offers non-flammability (according to ASHRAE Standard 34) and higher volumetric capacity than HFO-1234ze-E while still achieving a low GWP relatively to many incumbent working fluids.

Example 11

Performance of an Organic Rankine Cycle With the Non-flammable HFO-1234ze-E/HFC-134/HFC-134a (60/10/30 wt %) Blend as the Working Fluid Relative to Neat HFO-1234ze-E The following table compares the performance of an ORC with the non-flammable (according to ASHRAE Standard 34) HFO-1234ze-E/HFC-134/HFC-134a (60/10/30 wt %) blend as the working fluid relative to neat HFO-1234ze-E:

TABLE 12

|  | HFO-1234ze-E | Blend H | Blend H vs. HFO-1234ze-E |
|---|---|---|---|
| HFO-1234ze-E (wt %) | 100 | 60 |  |
| HFC-134 (wt %) | 0 | 10 |  |
| HFC-134a (wt %) | 0 | 30 |  |
| GWP$_{100}$ | 6 | 542.6 |  |
| Evaporator Temperature (C.) | 90 | 90 |  |
| Condenser Temperature (C.) | 20 | 20 |  |
| Pump Efficiency | 0.65 | 0.65 |  |
| Expander Efficiency | 0.75 | 0.75 |  |
| Superheat (K) | 5 | 5 |  |
| Subcooling (K) | 0 | 0 |  |
| Pressure, evaporator (MPa) | 2.47 | 2.78 |  |
| Pressure, condenser (MPa) | 0.43 | 0.49 |  |
| Pump Work (kJ/kg) | 2.9505 | 3.29 | 11.4 |
| Expander Work (kJ/kg) | 25.0815 | 25.35 | 1.1 |
| Net Work | 22.131 | 22.06 | −0.3 |
| Thermal Efficiency | 0.107 | 0.1056 | −1.3 |
| Volumetric Capacity (kJ/m$^3$) | 461.7 | 513.8 | 11.3 |
| Evaporator Glide (K) |  | 0.38 |  |
| Condenser Glide (K) |  | 0.58 |  |

Blend H offers non-flammability (according to ASHRAE Standard 34) and higher volumetric capacity than HFO-1234ze-E while still achieving a low GWP relatively to many incumbent working fluids.

Selected Embodiments

Embodiment A1. A method for converting heat from a heat source to mechanical energy, comprising heating a working fluid comprising E-1,3,3,3-tetrafluoropropene and at least one compound selected from 1,1,1,2-tetrafluoroethane and 1,1,2,2-tetrafluoroethane using heat supplied from the heat source; and expanding the heated working fluid to lower the pressure of the working fluid and generate mechanical energy as the pressure of the working fluid is lowered.

Embodiment A2. The method of Embodiment A1, wherein the working fluid is compressed prior to heating; and the expanded working fluid is cooled and compressed for repeated cycles.

Embodiment A3. The method of any of Embodiments A1-A2, wherein the working fluid is a nonflammable composition consisting essentially of E-1,3,3,3-tetrafluoropropene and at least one compound selected from 1,1,1,2-tetrafluoroethane and 1,1,2,2-tetrafluoroethane.

Embodiment A4. The method of any of Embodiments A1-A3, wherein the working fluid consists essentially of from about 1 weight percent to 69 weight percent E-1,3,3,3-tetrafluororpopene and about 99 weight percent to 31 weight percent 1,1,2,2-tetrafluoroethane.

Embodiment A5. The method of any of Embodiments A1-A4, wherein the working fluid consists essentially of from about 1 weight percent to 85 weight percent E-1,3,3, 3-tetrafluororpopene and about 99 weight percent to 15 weight percent 1,1,1,2-tetrafluoroethane.

Embodiment A6. The method of any of Embodiments A1-A5, wherein heat from a heat source is converted to mechanical energy using a sub-critical cycle comprising (a) compressing a liquid working fluid to a pressure below its critical pressure; (b) heating compressed liquid working fluid from (a) using heat supplied by the heat source to form vapor working fluid; (c) expanding heated working fluid from (b) to lower the pressure of the working fluid and generate mechanical energy; (d) cooling expanded working fluid from (c) to form a cooled liquid working fluid; and (e) cycling cooled liquid working fluid from (d) to (a) for compression.

Embodiment A7. The method of any of Embodiments A2-A5, wherein heat from a heat source is converted to mechanical energy using a trans-critical cycle comprising (a) compressing a liquid working fluid above said working fluid's critical pressure; (b) heating compressed working fluid from (a) using heat supplied by the heat source; (c) expanding heated working fluid from (b) to lower the pressure of the working fluid below its critical pressure and generate mechanical energy; (d) cooling expanded working fluid from (c) to form a cooled liquid working fluid; and (e) cycling cooled liquid working fluid from (d) to (a) for compression.

Embodiment A8. The method of any of Embodiments A2-A5, wherein heat from a heat source is converted to mechanical energy using a super-critical cycle comprising (a) compressing a working fluid from a pressure above its critical pressure to a higher pressure; (b) heating compressed working fluid from (a) using heat supplied by the heat source; (c) expanding heated working fluid from (b) to lower the pressure of the working fluid to a pressure above its critical pressure and generate mechanical energy; (d) cooling expanded working fluid from (c) to form a cooled working fluid above its critical pressure; and (e) cycling cooled liquid working fluid from (d) to (a) for compression.

Embodiment A9. The method of any of Embodiments A1-A8, wherein the working fluid comprises from 5 to about 95 weight percent E-1,3,3,3-tetrafluoropropene and from 5 to 95 weight percent of at least one compound selected from 1,1,1,2-tetrafluoroethane and 1,1,2,2-tetrafluoroethane.

Embodiment A10. The method of any of Embodiments A1-A8, wherein the working fluid is an azeotropic or azeotrope-like composition comprising from 1 to about 98 weight percent E-1,3,3,3-tetrafluoropropene, from 1 to 98 weight percent of 1,1,1,2-tetrafluoroethane and from 1 to 98 weight percent of 1,1,2,2-tetrafluoroethane.

Embodiment A11. The method of any of Embodiments A1-A10 and B1-B2, wherein the working fluid comprises from 5 to about 95 weight percent E-1,3,3,3-tetrafluoropropene, from 5 to 95 weight percent of 1,1,1,2-tetrafluoroethane and from 5 to 95 weight percent of 1,1,2,2-tetrafluoroethane.

Embodiment A12. The method of any of Embodiments A1-A10 and B1-B2, wherein the working fluid comprises from 35 to about 95 weight percent E-1,3,3,3-tetrafluoropropene, from 2 to 38 weight percent of 1,1,1,2-tetrafluoroethane and from 2 to 39 weight percent of 1,1,2,2-tetrafluoroethane.

Embodiment A13. The method of any of Embodiments A1-A10 and B1-B2, wherein the working fluid comprises from 35 to about 60 weight percent E-1,3,3,3-tetrafluoropropene, from 10 to 26 weight percent of 1,1,1,2-tetrafluoroethane and from 24 to 49 weight percent of 1,1,2,2-tetrafluoroethane.

Embodiment A14. The method of any of Embodiments A1-A10 and B1-B2, wherein the working fluid comprises from 5 to about 60 weight percent E-1,3,3,3-tetrafluoropropene, from 10 to 38 weight percent of 1,1,1,2-tetrafluoroethane and from 24 to 72 weight percent of 1,1,2,2-tetrafluoroethane.

Embodiment A15. The method of any of Embodiments A1-A10 and B1-B2, wherein the working fluid comprises from about 5 to about 95 weight percent E-1,3,3,3-tetrafluoropropene and from 5 to 95 weight percent of a mixture of 1,1,1,2-tetrafluoroethane and 1,1,2,2-tetrafluoroethane.

Embodiment A16. The method of any of Embodiments A1-A10 and B1-B2, wherein the working fluid comprises from 1 to about 85 weight percent E-1,3,3,3-tetrafluoropropene and from 99 to 15 weight percent of 1,1,1,2-tetrafluoroethane.

Embodiment A17. The method of any of Embodiments A1-A10 and B1-B2, wherein the working fluid comprises from 55 to about 81 weight percent E-1,3,3,3-tetrafluoropropene and from 45 to 18 weight percent of 1,1,1,2-tetrafluoroethane.

Embodiment A18. The method of any of Embodiments A1-A10 and B1-B2, wherein the working fluid comprises from 55 to about 70 weight percent E-1,3,3,3-tetrafluoropropene and from 45 to 30 weight percent of 1,1,1,2-tetrafluoroethane.

Embodiment A19. The method of any of Embodiments A1-A10 and B1-B2, wherein the working fluid comprises from 1 to about 69 weight percent E-1,3,3,3-tetrafluoropropene and from 99 to 31 weight percent of 1,1,2,2-tetrafluoroethane.

Embodiment A20. The method of any of Embodiments A1-A10 and B1-B2, wherein the working fluid comprises from 35 to about 95 weight percent E-1,3,3,3-tetrafluoropropene and from 65 to 5 weight percent of 1,1,2,2-tetrafluoroethane.

Embodiment A21. The method of any of Embodiments A1-A10 and B1-B2, wherein the working fluid comprises from 5 to about 60 weight percent E-1,3,3,3-tetrafluoropropene and from 95 to 40 weight percent of 1,1,2,2-tetrafluoroethane.

Embodiment A22. The method of any of Embodiments A1-A10 and B1-B2, wherein the working fluid comprises from 35 to about 60 weight percent E-1,3,3,3-tetrafluoropropene and from 65 to 40 weight percent of 1,1,2,2-tetrafluoroethane.

Embodiment A23. The method of any of Embodiments A1-A10 and B1-B2, wherein the working fluid comprises from 63 to about 75 weight percent E-1,3,3,3-tetrafluoropropene and from 37 to 25 weight percent of 1,1,2,2-tetrafluoroethane.

Embodiment B1. A power cycle apparatus containing a working fluid comprising E-1,3,3,3-tetrafluoropropene and at least one compound selected from 1,1,1,2-tetrafluoroethane and 1,1,2,2-tetrafluoroethane.

Embodiment B2. The power cycle apparatus of Embodiment B1, comprising (a) a heat exchange unit; (b) an expander in fluid communication with the heat exchange unit; (c) a working fluid cooling unit in fluid communication with the expander; and (d) a compressor in fluid communication with the working fluid cooler; wherein the compressor is further being in fluid communication with the heat exchange unit such that the working fluid then repeats flow through components (a), (b), (c) and (d) in a repeating cycle.

Embodiment B3. The power cycle apparatus of any of Embodiments B1-B2, wherein the working fluid comprises from 5 to 95 weight percent E-1,3,3,3-tetrafluoropropene and from 5 to 95 weight percent of at least one compound selected from 1,1,1,2-tetrafluoroethane and 1,1,2,2-tetrafluoroethane.

Embodiment C1. A working fluid comprising an azeotropic or azeotrope-like combination of E-HFO-1234ze, HFC-134, and HFC-134a.

Embodiment C2. The working fluid of Embodiment C1, comprising from about 1 weight percent to about 98 weight percent E-HFO-1234ze, from about 1 weight percent to about 98 weight percent HFC-134 and from about 1 weight percent to about 98 weight percent HFC-134a.

Embodiment C3. A composition suitable for use in organic Rankine apparatus, comprising a working fluid of any of Embodiments C1-C2 and at least one lubricant.

Embodiment C4. The composition of any of Embodiments C1-C3, wherein said lubricant is selected from the group consisting of polyalkylene glycols, polyol esters, polyvinylethers, perfluoropolyethers, polycarbonates, mineral oils, alkylbenzenes, synthetic paraffins, synthetic naphthenes, poly(alpha)olefins and combinations thereof.

Embodiment C5. A composition suitable for use in organic Rankine apparatus, comprising a working fluid of any of Embodiments C1-C4 and at least one other component selected from the group consisting of stabilizers, compatibilizers and tracers.

What is claimed is:

1. A method for converting heat from a heat source to mechanical energy in an organic Rankine apparatus, comprising heating a working fluid consisting essentially of E-1,3,3,3-tetrafluoropropene, 1,1,1,2-tetrafluoroethane, and 1,1,2,2-tetrafluoroethane, using heat supplied from the heat source; and expanding the heated working fluid to lower the pressure of the working fluid and generate mechanical energy as the pressure of the working fluid is lowered.

2. The method of claim 1, wherein the working fluid is compressed prior to heating; and the expanded working fluid is cooled and compressed for repeated cycles.

3. The method of claim 1, wherein the working fluid is a nonflammable composition.

4. The method of claim 2 wherein heat from a heat source is converted to mechanical energy using a sub-critical cycle comprising:
    (a) compressing a liquid working fluid to a pressure below its critical pressure;
    (b) heating compressed liquid working fluid from (a) using heat supplied by the heat source to form vapor working fluid;
    (c) expanding heated working fluid from (b) to lower the pressure of the working fluid and generate mechanical energy;
    (d) cooling expanded working fluid from (c) to form a cooled liquid working fluid; and
    (e) cycling cooled liquid working fluid from (d) to (a) for compression.

5. The method of claim 2 wherein heat from a heat source is converted to mechanical energy using a trans-critical cycle comprising:
    (a) compressing a liquid working fluid above said working fluid's critical pressure;
    (b) heating compressed working fluid from (a) using heat supplied by the heat source;
    (c) expanding heated working fluid from (b) to lower the pressure of the working fluid below its critical pressure and generate mechanical energy;
    (d) cooling expanded working fluid from (c) to form a cooled liquid working fluid; and
    (e) cycling cooled liquid working fluid from (d) to (a) for compression.

6. The method of claim 2 wherein heat from a heat source is converted to mechanical energy using a super-critical cycle comprising:
    (a) compressing a working fluid from a pressure above its critical pressure to a higher pressure;
    (b) heating compressed working fluid from (a) using heat supplied by the heat source;
    (c) expanding heated working fluid from (b) to lower the pressure of the working fluid to a pressure above its critical pressure and generate mechanical energy;
    (d) cooling expanded working fluid from (c) to form a cooled working fluid above its critical pressure; and
    (e) cycling cooled liquid working fluid from (d) to (a) for compression.

7. The method of claim 1, wherein the working fluid comprises from 5 to about 95 weight percent E-1,3,3,3-tetrafluoropropene and from 5 to 95 weight percent total of 1,1,1,2-tetrafluoroethane and 1,1,2,2-tetrafluoroethane.

8. An organic Rankine apparatus comprising a working fluid consisting essentially of E-1,3,3,3-tetrafluoropropene, 1,1,1,2-tetrafluoroethane, and 1,1,2,2-tetrafluoroethane.

9. The organic Rankine apparatus of claim 8 comprising (a) a heat exchange unit; (b) an expander in fluid communication with the heat exchange unit; (c) a working fluid cooling unit in fluid communication with the expander; and (d) a compressor in fluid communication with the working fluid cooler; wherein the compressor is further being in fluid communication with the heat exchange unit such that the working fluid then repeats flow through components (a), (b), (c) and (d) in a repeating cycle.

10. The organic Rankine apparatus of claim 8, wherein the working fluid comprises from 5 to 95 weight percent E-1,3,3,3-tetrafluoropropene and from 5 to 95 weight percent total of 1,1,1,2-tetrafluoroethane and 1,1,2,2-tetrafluoroethane.

11. The method of claim 1, wherein the working fluid consists essentially of from about 35 to about 95 weight percent E-1,3,3,3-tetrafluoropropene and from about 5 to about 65 weight percent total of the 1,1,2,2-tetrafluoroethane, and 1,1,1,2-tetrafluoroethane.

12. The method of claim 1, wherein the working fluid consists essentially of from about 5 to about 60 weight percent E-1,3,3,3-tetrafluoropropene and from about 40 to about 95 weight percent total of the 1,1,2,2-tetrafluoroethane and 1,1,1,2-tetrafluoroethane.

13. The method of claim 1, wherein the working fluid consists essentially of from about 35 to about 60 weight percent E-1,3,3,3-tetrafluoropropene and from about 40 to about 65 weight percent total of the 1,1,2,2-tetrafluoroethane and 1,1,1,2-tetrafluoroethane.

14. The method of claim 1, wherein the working fluid consists essentially of from about 35 to about 60 weight percent E-1,3,3,3-tetrafluoropropene, from about 10 to about 26 weight percent of 1,1,2,2-tetrafluoroethane, and from about 24 to about 49 weight percent of 1,1,1,2-tetrafluoroethane.

15. The method of claim 1, wherein the working fluid is an azeotropic or azeotrope-like composition.

16. The organic Rankine apparatus of claim 10, wherein the working fluid consists essentially of from about 35 to about 95 weight percent E-1,3,3,3-tetrafluoropropene and from about 5 to about 65 weight percent total of the 1,1,2,2-tetrafluoroethane, and 1,1,1,2-tetrafluoroethane.

17. The organic Rankine apparatus of claim 10, wherein the working fluid consists essentially of from about 5 to about 60 weight percent E-1,3,3,3-tetrafluoropropene and from about 40 to about 95 weight percent total of the 1,1,2,2-tetrafluoroethane and 1,1,1,2-tetrafluoroethane.

18. The organic Rankine apparatus of claim 10, wherein the working fluid consists essentially of from about 35 to about 60 weight percent E-1,3,3,3-tetrafluoropropene and from about 40 to about 65 weight percent total of the 1,1,2,2-tetrafluoroethane and 1,1,1,2-tetrafluoroethane.

19. The organic Rankine apparatus of claim 10, wherein the working fluid consists essentially of from about 35 to about 60 weight percent E-1,3,3,3-tetrafluoropropene, from about 10 to about 26 weight percent of 1,1,2,2-tetrafluoroethane, and from about 24 to about 49 weight percent of 1,1,1,2-tetrafluoroethane.

20. The organic Rankine apparatus of claim 10, wherein the working fluid is an azeotropic or azeotrope-like composition.

* * * * *